US010166597B2

(12) United States Patent
Mizumura et al.

(10) Patent No.: US 10,166,597 B2
(45) Date of Patent: Jan. 1, 2019

(54) CAMSHAFT-MANUFACTURING METHOD AND GEAR SHAFT-MANUFACTURING METHOD

(71) Applicant: NIPPON STEEL & SUMITOMO METAL CORPORATION, Chiyoda-ku, Tokyo (JP)

(72) Inventors: Masaaki Mizumura, Kisarazu (JP); Atsushi Tomizawa, Nago (JP); Hidehiro Arita, Kimitsu (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 580 days.

(21) Appl. No.: 14/780,706

(22) PCT Filed: Apr. 2, 2014

(86) PCT No.: PCT/JP2014/059734
§ 371 (c)(1),
(2) Date: Sep. 28, 2015

(87) PCT Pub. No.: WO2014/163108
PCT Pub. Date: Oct. 9, 2014

(65) Prior Publication Data
US 2016/0052045 A1 Feb. 25, 2016

(30) Foreign Application Priority Data

Apr. 3, 2013 (JP) .................................. 2013-078017
Mar. 19, 2014 (JP) .................................. 2014-057174

(51) Int. Cl.
F01L 1/047 (2006.01)
B21K 1/08 (2006.01)
(Continued)

(52) U.S. Cl.
CPC .............. *B21K 1/08* (2013.01); *B21D 53/845* (2013.01); *F01L 1/047* (2013.01); *B21D 26/033* (2013.01);
(Continued)

(58) Field of Classification Search
CPC .... B21K 1/08; F01L 1/047; F01L 2001/0471; B21D 53/845; B21D 26/033; F16C 2360/18; Y10T 29/49293
See application file for complete search history.

(56) References Cited

FOREIGN PATENT DOCUMENTS

| CN | 1257965 A | 6/2000 |
| JP | 63-238933 | 10/1988 |

(Continued)

OTHER PUBLICATIONS

International Search Report dated Apr. 28, 2014 issued in corresponding PCT Application No. PCT/JP2014/059734 [with English Translation].

(Continued)

Primary Examiner — Sarang Afzali
Assistant Examiner — Ruth G Hidalgo-Hernandez
(74) Attorney, Agent, or Firm — Birch, Stewart, Kolasch & Birch, LLP

(57) ABSTRACT

A camshaft-manufacturing method includes: a split die group preparation step; a processing preparation step of preparing a cam including a through-hole, a cam body which is smaller than each of the cam accommodation portions, and ribs which are provided on both sides in a thickness direction of the cam body and configured to be fitted into the rib accommodation portions, and a hollow shaft, accommodating the cam body in the cam accommodation portion and fitting the ribs in the rib accommodation portion, and inserting the hollow shaft into the through-hole of the cam; and a processing step of performing hydroform processing, and (Continued)

fixing the cam to the hollow shaft by expanding the hollow shaft.

13 Claims, 20 Drawing Sheets

(51) Int. Cl.
*B21D 53/84* (2006.01)
*B21D 26/033* (2011.01)

(52) U.S. Cl.
CPC ... *F01L 2001/0471* (2013.01); *F16C 2360/18* (2013.01); *Y10T 29/49293* (2015.01)

(56) References Cited

FOREIGN PATENT DOCUMENTS

| | | |
|---|---|---|
| JP | 05-077026 | 3/1993 |
| JP | 07-208118 | 8/1995 |
| JP | 2003-314576 | 11/2003 |
| JP | 2004-011743 | 1/2004 |
| JP | 2008-163833 | 7/2008 |
| KR | 10-2012-0114116 A | 10/2012 |

OTHER PUBLICATIONS

Chinese Office Action and Chinese Search Report, dated Jan. 4, 2017, for Chinese Application No. 201480018157.5, with a partial English translation of the Chinese Search Report.

CAMSHAFT-MANUFACTURING METHOD AND GEAR SHAFT-MANUFACTURING METHOD

TECHNICAL FIELD OF THE INVENTION

This application is a national stage application of International Application No. PCT/JP2014/059734, filed on Apr. 2, 2014, which claims priority to Japanese Patent Application No. 2013-078017, filed on Apr. 3, 2013, and Japanese Patent Application No. 2014-057174, filed on Mar. 19, 2014, each of which is incorporated herein by reference in its entirety.

The present invention relates to a camshaft-manufacturing method and a gear shaft-manufacturing method.

RELATED ART

In the related art, a camshaft which drives intake and exhaust valves of an engine for a vehicle is manufactured, by casting, forging, or welding a earn piece or a journal piece to a shaft configured of a round steel bar. In recent years, in order to reduce tire weight of the engine, a hollow camshaft in which a steel pipe is used for the shaft is used practically and is widely used for a gasoline engine or a diesel engine.

In the hollow camshaft, in a state where a metal pipe passes through a cam having wear resistance, the pipe is expanded by applying hydraulic pressure to the inner portion of the metal pipe, and thus, the cam is fixed to the outer circumferential portion of the metal pipe. In addition, there is an example in which the cam is fixed to the outer circumferential portion of the metal pipe by injecting molten metal into the metal pipe so as to expand and deform the metal pipe.

For example, Patent Document 1 discloses a camshaft-manufacturing method, which includes preparing cams and a forming die which can accommodate the cams and includes a cavity portion having a shape corresponding to the shape of a camshaft, disposing the cams in a predetermined position inside the cavity portion of the forming die, disposing a pipe member in the cavity portion so as to pass through a through-hole of each cam, and combining the pipe member with each cam piece by pressurizing and injecting molten aluminum alloy in the hollow portion of the pipe member to expand and deform the pipe member.

PRIOR ART DOCUMENT

Patent Document

Patent Document 1 Japanese Unexamined Patent Application, First Publication No. H5-77026

DISCLOSURE OF THE INVENTION

Problems to be Solved by the Invention

In the manufacturing method disclosed in Patent Document 1, the forming die which includes a cavity portion having the shape corresponding to the camshaft shape is used. Accordingly, it is necessary to prepare the forming die for each type of camshaft.

In addition, when the forming die is designed, it is necessary to provide a slight clearance between the cavity and the cam in order to easily extract the camshaft from the forming die alter the camshaft is manufactured. The clearance provides a slight error with respect to a design value of an operation angle of the cam with respect to the shaft. Since the clearance between the cavity and the cam is set for each cam, in the manufactured camshaft, errors in the operation angles of cams overlap due to the clearance. Accordingly, error in the operation angle in the cam of the camshaft may increase.

Moreover, the cavity and the cam come into contact with each other, therefore scratches may occur on a sliding surface of the cam, and thus, after the camshaft is manufactured, it is necessary to remove the scratches by machining the sliding surface of the cam.

In addition, the above-described problems are not limited to the camshaft and similarly occur when various gears are mounted on a hollow shaft.

The present invention is made in consideration of the above-described problems, and an object thereof is to provide a camshaft-manufacturing method which increases accuracy of the operation angle of the cam with respect to the shaft without preparing the forming die for each type of the camshaft and additionally machining the manufactured camshaft.

In addition, another object of the present invention is to provide a gear shaft-manufacturing method which increases accuracy of an attachment angle of a gear with respect to the shaft without preparing the forming die for each type and additionally machining a manufactured gear shaft.

Means for Solving the Problem

In order to achieve the objects, the present invention adopts the following configurations.

(1) According to a first aspect, a camshaft-manufacturing method is provided, including: preparing a plurality of split dies including recessed cam accommodation portions provided on side surfaces and rib accommodation portions formed in the recessed cam accommodation portions, configuring a split die group by butting side surfaces of the split dies, and forming a plurality of cam accommodation portions including the recessed cam accommodation portion between the split dies, in order to prepare the split die group; preparing a cam including a through-hole, a cam body which is smaller than each of the cam accommodation portions, and ribs which are provided on both sides in a thickness direction of the cam body and configured to be fitted into the rib accommodation portions, and a hollow shaft, accommodating the cam body in the cam accommodation portion and fitting the ribs in the rib accommodation portion, and inserting the hollow shaft into the through-hole of the cam, in order to prepare processing; and introducing pressurized fluid into a hollow portion of the hollow shaft and performing hydroform processing, and fixing the cam to the hollow shaft by expanding the hollow shaft, in order to perform the processing.

(2) In the camshaft-manufacturing method according to (1), the method may further include: preparing a pair of the split die groups in the preparing of the split die group; and fixing the cam and the hollow shaft so as to be interposed by the pair of split die groups in preparing processing.

(3) in the camshaft-manufacturing method according to (1) or (2), a plurality of rib-receiving surfaces may be provided on the rib accommodation portion of the split die, a plurality of abutting surfaces may be provided on the rib of the cam, the abutting surfaces may abut the rib-receiving surfaces when the cam is disposed on the cam accommodation portion, and the cam may be fixed to the cam accommodation portion.

(4) In the camshaft-manufacturing method according to (3), the plurality of rib-receiving surfaces of the split die may be configured of horizontal surfaces and a pair of vertical surfaces, and the plurality of abutting surfaces of the rib may be configured of first abutting surfaces abutting the horizontal surfaces and second abutting surfaces abutting the vertical surfaces.

(5) In the camshaft-manufacturing method according to (3), the plurality of rib-receiving surfaces of the split die may be configured of inclined surfaces, and the plurality of abutting surfaces of the rib may be configured of third abutting surfaces abutting the inclined surfaces.

(6) In the camshaft-manufacturing method according to (3), in the pair of split die groups, the plurality of rib-receiving surfaces of the split dies configuring one split die group may be configured of inclined surfaces, the plurality of rib-receiving surfaces of the split dies configuring the other split die group may be configured of horizontal surfaces, and the plurality of abutting surfaces of the rib may be configured of third abutting surfaces abutting the inclined surfaces, and fourth abutting surfaces abutting the horizontal surfaces.

(7) In the camshaft-manufacturing method according to any one of (1) to (6), in preparing processing, after the cam is mounted on the split die group so that the cam body is accommodated in the cam accommodation portion and the ribs are fitted into the rib accommodation portions, the hollow shaft may be inserted into the through-hole of the cam.

(8) In the camshaft-manufacturing method according to any one of (1) to (6), in preparing processing, after the hollow shaft is inserted into the through-hole of the cam, the cam may be mounted on the split die group so that the cam body is accommodated in the cam accommodation portion and the ribs are fitted into the rib accommodation portions.

(9) According to a second aspect of the present invention, there is provided a gear shaft-manufacturing method, including: preparing a plurality of split dies including recessed gear accommodation portions provided on side surfaces and rib accommodation portions formed in the recessed gear accommodation portions, configuring a split die group by butting side surfaces of the split dies, and forming a plurality of gear accommodation portions including the recessed gear accommodation portion between the split dies, in order to prepare the split die group; preparing a gear including a through-hole, a gear body which is smaller than each of the gear accommodation portions, and ribs which are provided on both sides in a thickness direction of the gear body and configured to be fitted into the rib accommodation portions, and a hollow shaft, accommodating the gear body in the gear accommodation portion and titling the ribs in the rib accommodation portion, and inserting the hollow shaft into the through-hole of the gear, in order to prepare processing; and introducing pressurized fluid into a hollow portion of the hollow shaft and performing hydroform processing, and fixing the gear to the hollow shaft by expanding the hollow shaft, in order to perform tire processing.

Effects of the Invention

According to the aspects of the camshaft-manufacturing method, since the cam having the cam body which is smaller than the cam accommodation portion is accommodated in the cam accommodation portion of the split die, even in the cams in which operation angles with respect to the hollow shaft are different from each other, it is possible to use the same split die, and it is not necessary to prepare the split die for each cam. In addition, since the cam body does not come into contact with the wall surfaces of the recessed cam accommodation portion partitioning the cam accommodation portion, there is no concern that scratches may occur on the sliding surface of the cam, and it is not necessary to additionally machine the manufactured camshaft. In addition, since the ribs of the cam are fitted into the rib accommodation portions of the split die, it is possible to accurately determine the operation angles of the cams with respect to the hollow shaft, and thus, it is possible to manufacture the camshaft having high accuracy in the operation angles of the cams with respect to the shaft.

In addition, according to the aspects of the camshaft-manufacturing method, the pair of split die groups is prepared, the cams and the hollow shaft are fixed in a state where the cams and the hollow shaft are interposed between the pair of split die groups. Accordingly, it is possible to securely fix the shaft and the cams, and it is possible to manufacture the camshaft having high accuracy in the operation angles of the cams with respect to the shaft.

Moreover, according to the aspects of the camshaft-manufacturing method, since the plurality of abutting surfaces provided on the ribs of the cam abut the plurality of rib-receiving surfaces provided on the rib accommodation portions, it is possible to accurately determine the operation angle for each cam with respect to the shaft.

In addition, since the cam and the split die come into contact with each other on the rib-receiving surfaces of the split die and the abutting surface of the cam, unlike in a case where the entire cam comes into contact with a cavity in the related art, it is possible to easily extract the cam from the split die.

Moreover, according to the aspects of the camshaft-manufacturing method, since the plurality of rib-receiving surfaces of the split die are configured of the horizontal surface and the pair of vertical surfaces, and the plurality of abutting surfaces of the rib are configured of the first abutting surfaces abutting the horizontal surface and the second abutting surfaces abutting the vertical surfaces, it is possible to correctly determine the position of the cam on the split die group, and it is possible to manufacture the camshaft having high accuracy in the operation angles of the cams with respect to the shaft. In addition, when the camshaft, is removed from the split dies, since the camshaft is removed while the vertical surfaces of the rib-receiving surface and the second abutting surfaces slide with respect to each other, it is possible to easily remove the camshaft from the split dies.

In addition, according to the aspects of the camshaft-manufacturing method, since the plurality of rib-receiving surfaces of the split die are configured of inclined surfaces, and the plurality of abutting surfaces of the rib are configured of third abutting surfaces abutting the inclined surfaces, it is possible to correctly determine the positions of the cams in an up-down direction and a horizontal direction on the split die group, and it is possible to manufacture the camshaft having high accuracy in the operation angles of the cams with respect to the shaft, in addition, since rib-receiving surfaces of the split die side are configured of inclined surfaces and the abutting surfaces of the cam side are configured of third abutting surfaces abutting the inclined surfaces, when the camshaft is removed from the split dies, it is possible to remove the camshaft in a state where the rib-receiving surfaces and third abutting surfaces do not slide, and it is possible to more easily remove the camshaft from the split dies.

In addition, according to die aspects of the camshaft-manufacturing method, in the pair of split die groups, the rib-receiving surfaces of the split dies configuring one split die group are configured of inclined surfaces, the rib-receiving surfaces of the split dies configuring the other split die group are configured of horizontal surfaces, and the abutting surfaces of the cam side are configured of third abutting surfaces abutting the inclined surfaces, and fourth abutting surfaces abutting the horizontal surfaces. Accordingly, it is possible to correctly determine the positions of the cams on the one split die group by using the rib-receiving surfaces of the inclined surfaces and the third abutting surfaces abutting the rib-receiving surfaces, and it is possible to manufacture the camshaft having high accuracy in the operation angles of the cams with respect to the shaft. In addition, the cams can be fixed by the rib-receiving surfaces configured of the rib-receiving surfaces provided on the one split die group and the rib-receiving surfaces configured of the horizontal surfaces provided on the other split die group in the state where the cams are interposed front the upper and lower sides, and it is possible to manufacture the camshaft having high accuracy in the operation angles of the cams with respect to the shaft.

Moreover, according to the aspects of the camshaft-manufacturing method, in preparing processing, since the hollow shaft is inserted into the through-holes of the cams after the cams are mounted on the split die group, it is possible to insert the cams into the hollow shaft in the state where the cams are fixed to the hollow shaft, and it is possible to improve workability.

In addition, according to the aspects of the camshaft-manufacturing method, in preparing processing, since the cam and the hollow shaft are mounted on the split die group after the hollow shaft is inserted into the through-holes of the cams, immediately after the cams are mounted on the split die group, it is possible to move the processing to the next step, and thus, it is possible to improve productivity.

In addition, according to the aspects of the gear shaft-manufacturing method, since the gear body is accommodated in the gear accommodation portion when the gear having the gear body which is smaller than the gear accommodation portion is disposed in the gear accommodation portion of the split die, even in the gears in which attachment angles with respect to the shaft are different from each other, it is possible to use the same split die, and it is not necessary to prepare the split die for each gear. In addition, since the gear body does not come into contact with the wall surfaces of the recessed gear accommodation portion partitioning the gear accommodation portion, there is no concern that scratches may occur on the gear, and it is not necessary to additionally machine the manufactured gear shaft, hi addition, since the ribs of the gear are fitted into the rib accommodation portions of the split die, it is possible to accurately determine the attachment angles of the gears with respect to the shaft, and thus, it is possible to increase accuracy in the mounting of the gear with respect to the shaft.

FIRST EMBODIMENTS OF THE INVENTION

First Embodiment

Hereinafter, a first embodiment of the present invention will be described with reference to the drawings.

Figure 1:
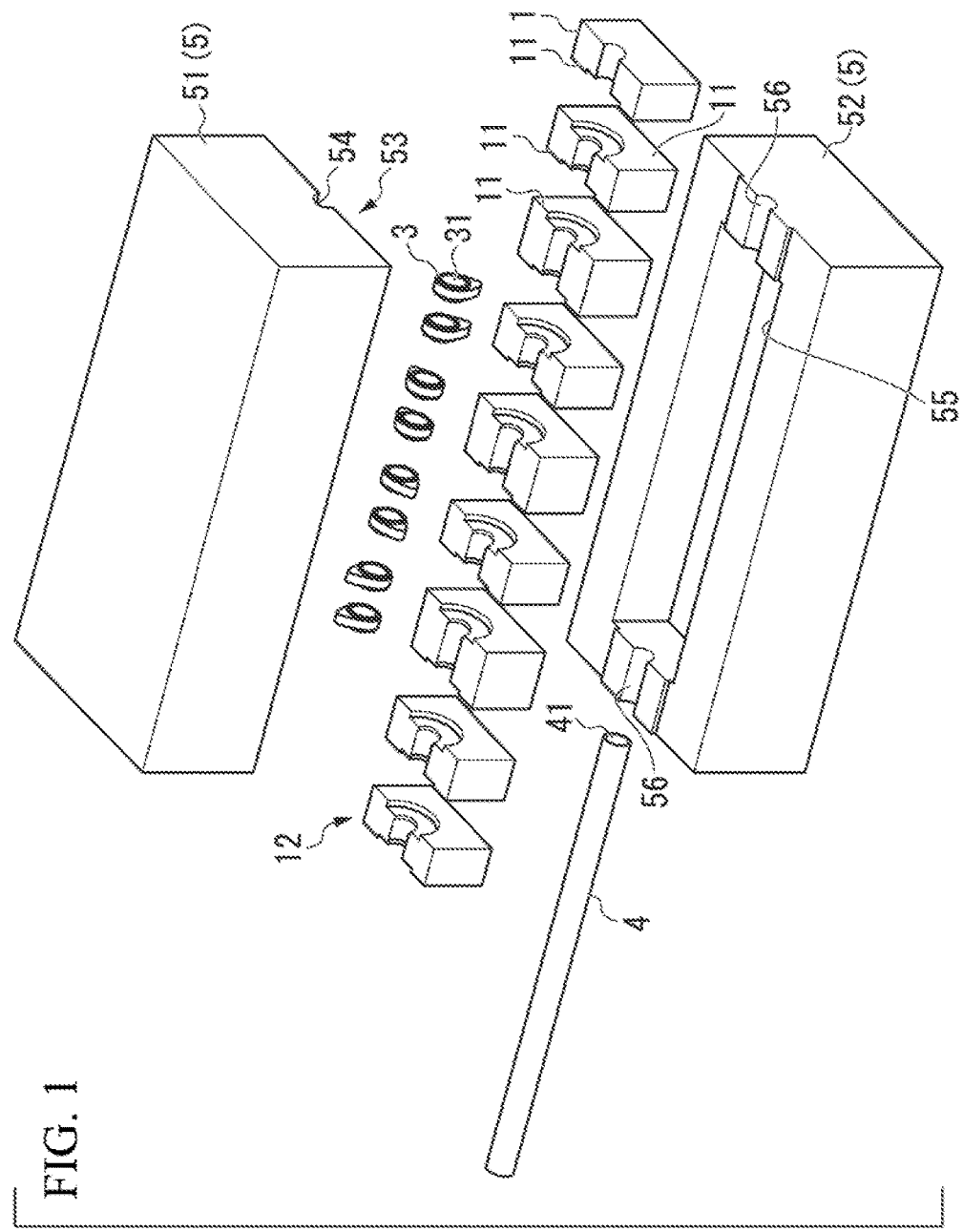
FIG. 1 is a perspective view explaining a camshaft-manufacturing method according to a first embodiment of the present invention.

As shown in FIG. 1, in a camshaft-manufacturing method of the present embodiment a plurality of split dies 1 is prepared, a split die group 12 is configured by butting side surfaces 11 of the split dies 1, cams 3 and a hollow shaft 4 are disposed on the split die group 12, the cams 3, the hollow shaft 4, and the split die group 12 are accommodated in a case 5 including an upper case 51 and a lower case 52, pressurized, fluid is introduced into a hollow portion 41 of the hollow shaft 4, hydroform processing is performed, the cams 3 are fixed to the hollow shaft 4 by expanding the hollow shaft 4, and thus, a camshaft 6 is manufactured.

Figure 2:
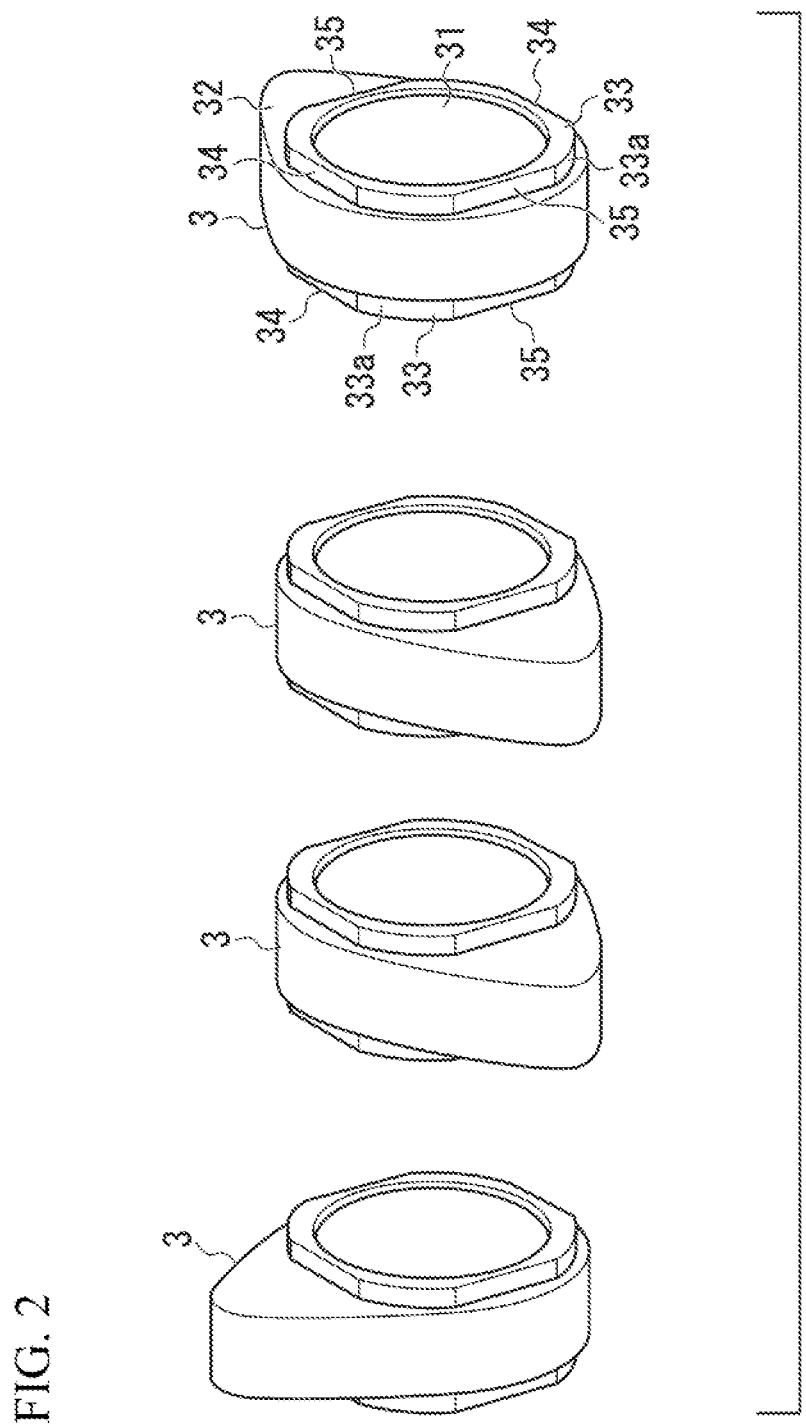
FIG. 2 is a perspective view showing a cam which is used in the camshaft-manufacturing method according to the first embodiment of the present, invention.
Figure 4:
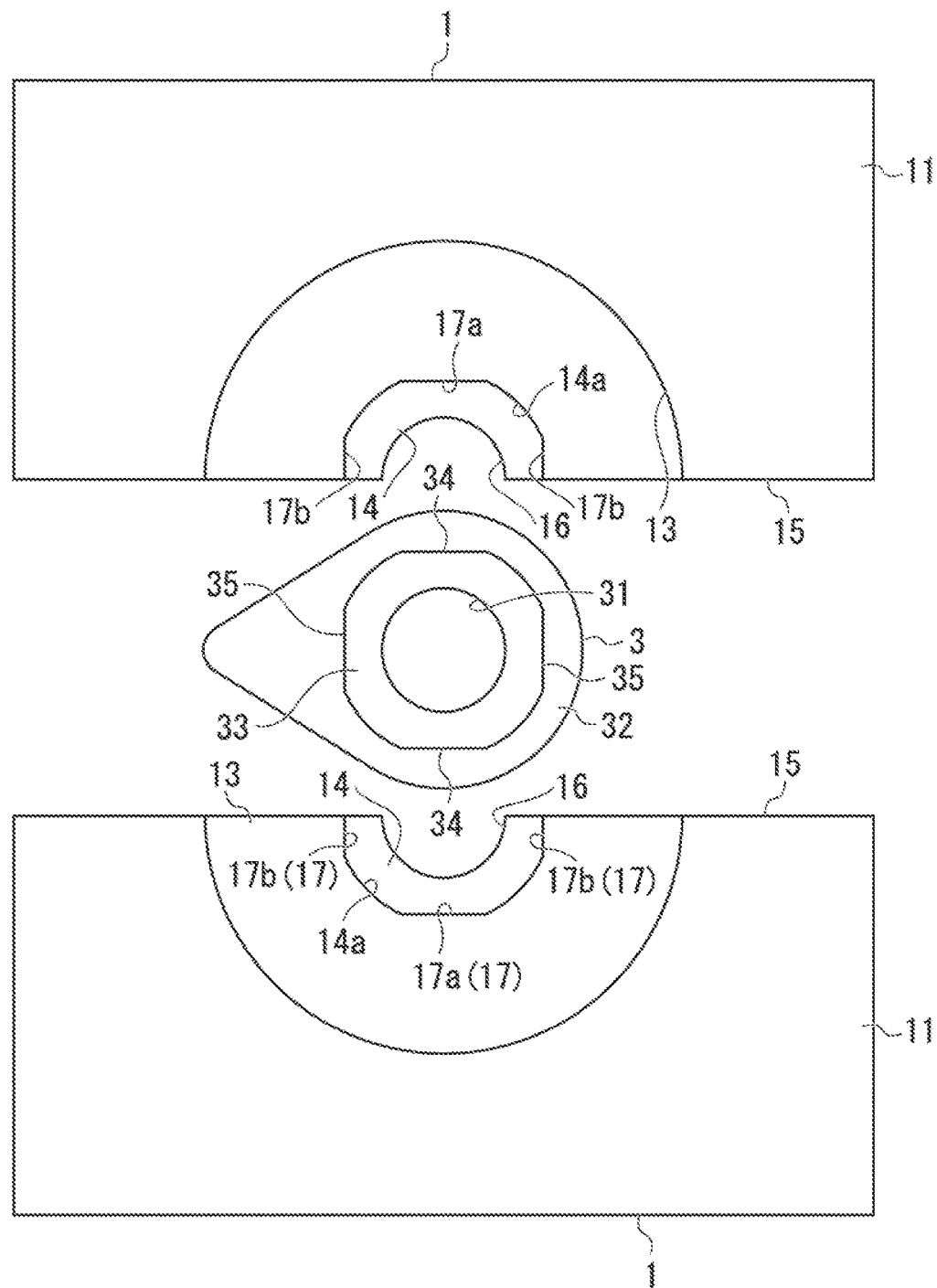
FIG. 4 is a side view showing the cam and the split die which are used in the camshaft-manufacturing method according to the first embodiment of the present invention.
Figure 5:
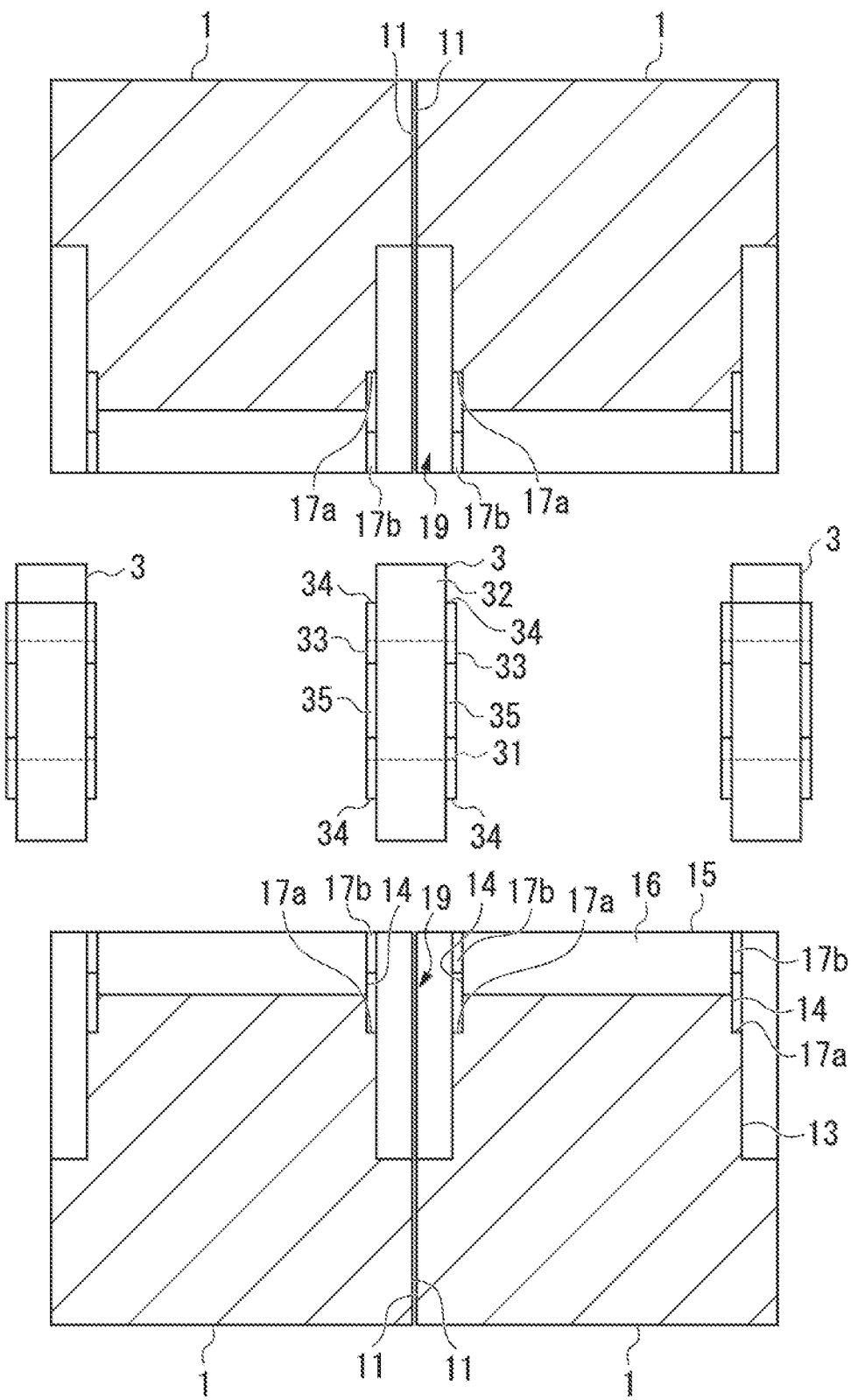
FIG. 5 is a front view showing the cam and the split die which are used in the camshaft-manufacturing method according to the first embodiment of the present invention.

As shown in FIGS. 2, 4, and 5, each of the cams 3 includes a cam body 32, and ribs 33 which are provided on both sides in a thickness direction of the cam body 32. A round-shaped through-hole 31 in a plan view is provided in the cam body 32, and annular ribs 33 are provided to surround the round-shaped through-hole 31. In addition, the shape in a plan view of the through-hole 31 may not be a perfect circle. White an outer circumferential end surface 33a of each of the ribs 33 is partially formed in a cylindrical surface, the other portions are formed of four flat surfaces in which the cylindrical surface is partially cut off. Among four flat surfaces, surfaces parallel to each other are first abutting surfaces 34, other surfaces parallel to each other are second abutting surfaces 35, and the first and second abutting surfaces 34 and 35 are orthogonal to each other. When each cam 3 is positioned at a position corresponding to an operation angle with respect to the hollow shaft 4, the pair of first abutting surfaces 34 is configured so as to be directed in an up-down direction, and the pair of second abutting surfaces 35 is configured so as to be directed to the sides. The cam 3 is formed of steel, an aluminum material, or the like.

Moreover, as shown in FIG. 1, a hollow portion 41 is provided in the hollow shaft 4. The hollow shaft 4 is configured of a metal pipe such as a steel pipe or an aluminum pipe.

Figure 3:
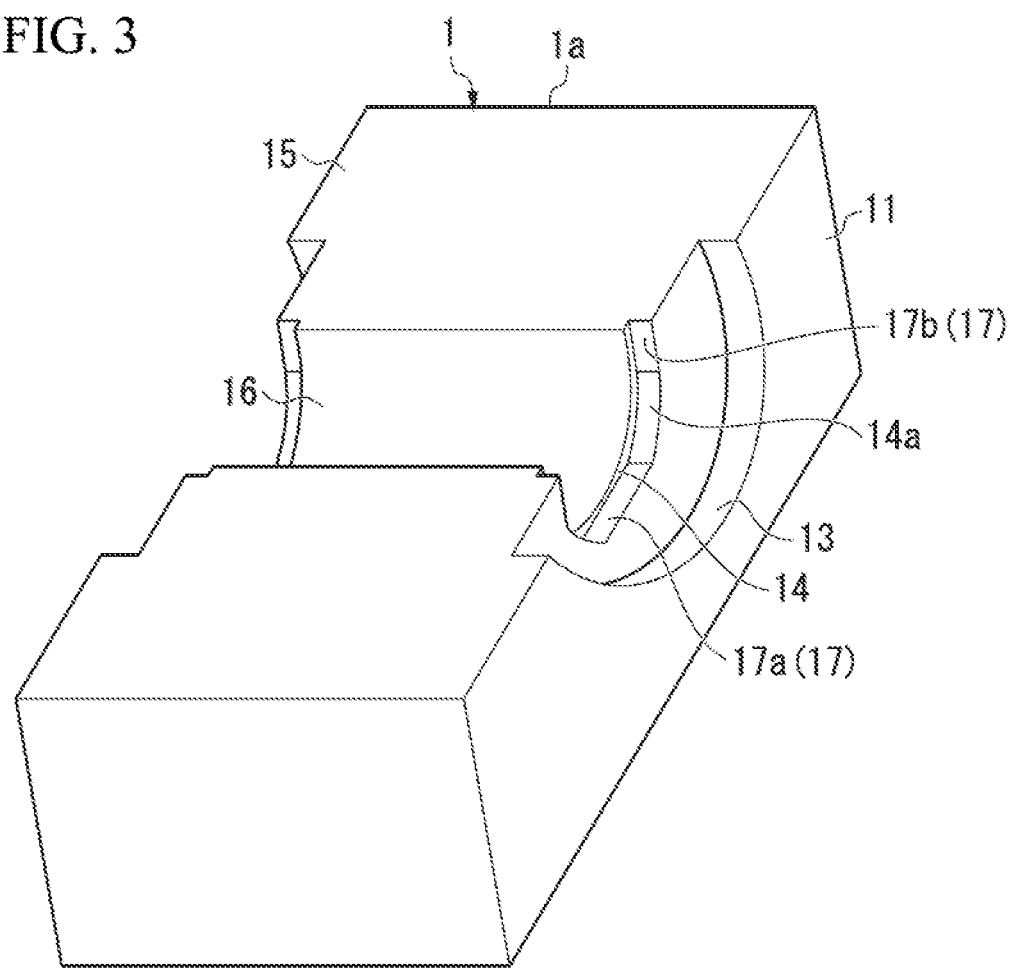
FIG. 3 is a perspective view showing a split die which is used in the camshaft-manufacturing method according to the first embodiment of the present invention.

Next, as shown in FIGS. 3, 4, and 5, in the split die 1, recessed cam accommodation portions 13 aid rib accommodation portions 14 are provided on both side surfaces 11 of a split die body 1a formed of metal, and a shaft receiving groove 16 is provided on a butting surface 15 which is an upper surface of the split die body 1a.

Each of the recessed cam accommodation portions 13 is provided on the side surface 11 and is provided so as to cut off a portion of the butting surface 15. The recessed earn accommodation portion 13 is integral with the recessed cam accommodation portion 13 of another split die 1 to configure a cam accommodation portion 19. Since the recessed cam accommodation portion 13 is provided so as to cut off tire butting surface 15, when the plurality of split dies 1 are integrated to configure the split die group 12, the cam accommodation portion 19 is recessed so as to be opened to the butting surface 15. The size of the cam accommodation portion 19 is set so as to accommodate a lower half of the cam 3.

The rib accommodation portion 14 is provided inside the recessed cam accommodation portion 13 and is provided so as to further cut off the recessed cam accommodation portion 13. In addition, the rib accommodation portion 14 is provided to cut off the butting surface 15. Accordingly, when the plurality of split dies 1 are integrated to configure the split die group 12, the rib accommodation portion 14 is opened to the butting surface 15 and is recessed to communicate with the cam accommodation portion 19. An end surface 14a partitioning the rib accommodation portion 14 is configured of a plurality of rib-receiving surfaces 17 in which, while a cylindrical surface is partially formed, the cylindrical surface is partially cut off in other portions. The rib-receiving surface 17 includes a horizontal surface 17a provided on a bottom portion of the rib accommodation portion 14, and a pair of vertical surfaces 17b coming into contact with the butting surface 15. The horizontal surface 17a and the vertical surfaces 17b are orthogonal to each other.

In addition, as shown in FIG. 1, a split, die accommodation portion 53 which accommodates the upper split die group 12 is provided on the upper case 51, and shaft receiving portions 54 are provided on both sides in a longitudinal direction of the split die accommodation portion 53. Similarly, a split die accommodation portion 55 which accommodates the lower split die group 12 is provided on the lower case 52, and shaft receiving portions 56 are provided on both sides in a longitudinal direction of the split die accommodation portion 55.

Next, a manufacturing step of the camshaft will be described according to procedures therefor. The camshaft-manufacturing method of the present embodiment includes a split die group preparation step of configuring the split die group 12 by butting the side surfaces 11 of the split dies 1, a processing preparation step of disposing the cams 3 in the cam accommodation portions 19 of the split die group 12 and inserting the hollow shaft 4 into the through-holes 31 of the cams 3, and a processing step of introducing the pressurized fluid into the hollow portion 41 of the hollow shaft 4, performing the hydroform processing, and fixing the cams 3 to the hollow shaft 4 by expanding the hollow shaft 4.

In addition, when the cams 3 and the hollow shaft 4 are disposed on the split die group 12, as described above, the hollow shaft 4 may be inserted into the through-holes 31 of the cams 3 alter the cams 3 are disposed on the split die group 12. In addition, after the hollow shaft 4 is inserted into the through-holes 31 of the cams 3 and the cams 3 and the hollow shaft 4 are combined with each other, the combined cams 3 and the hollow shaft 4 may be disposed on the split die group 12.

(Split Die Group Preparation Step)

Figure 6:
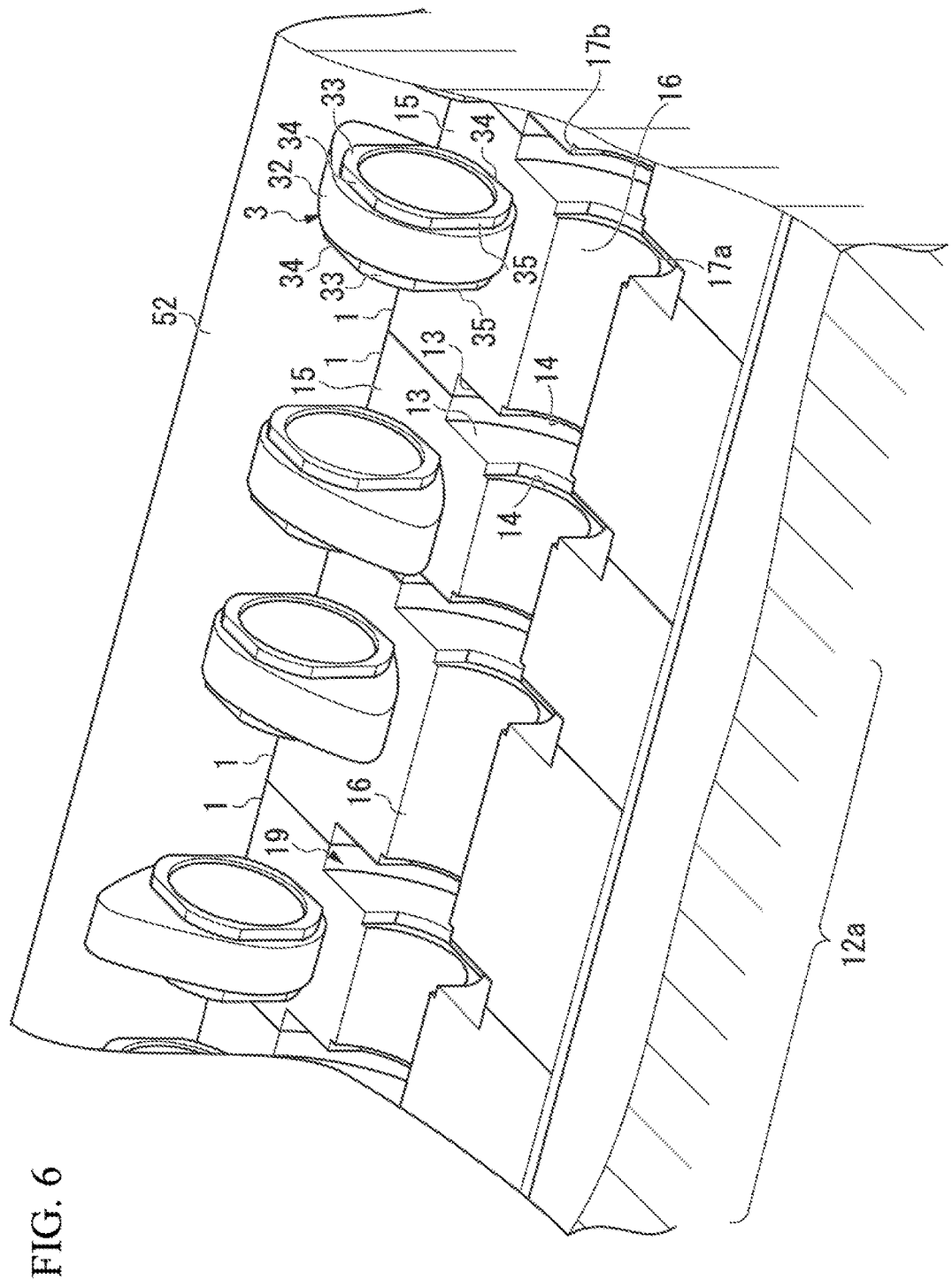
FIG. 6 is a perspective view explaining the camshaft-manufacturing method according to the first embodiment of the present invention.

As shown in FIG. 6, the plurality of split dies 1 are prepared, the split dies 1 are arranged so that the side surfaces 11 of the split dies 1 are butted to each other and the butting surfaces 15 configure the same surface, and thus, the lower split die group 12a is configured. The lower split die group 12a may be accommodated in the split die accommodation portion 55 of the lower case 52 shown in FIG. 1. In this case, the recessed cam accommodation portions 13 of the split dies 1 are integrated between the split dies 1, and thus, the can accommodation portion 19 is formed. The size of the cam accommodation portion 19 is set so as to accommodate the lower half of the cam 3 even when the cam 3 is positioned in any state. For example, when the shape of the cam accommodation portion 19 is set so as to be a semicircular round-groove shape, a width of the round groove is set so as to exceed a long-axis length of the cam. In addition, the rib accommodation portions 14 are positioned on both sides of the cam accommodation portion 19 along the arrangement direction of the split dies 1. In addition, the cam 3 corresponding to each cam accommodation portion 19 is prepared.

(Processing Preparation Step)

Figure 7:
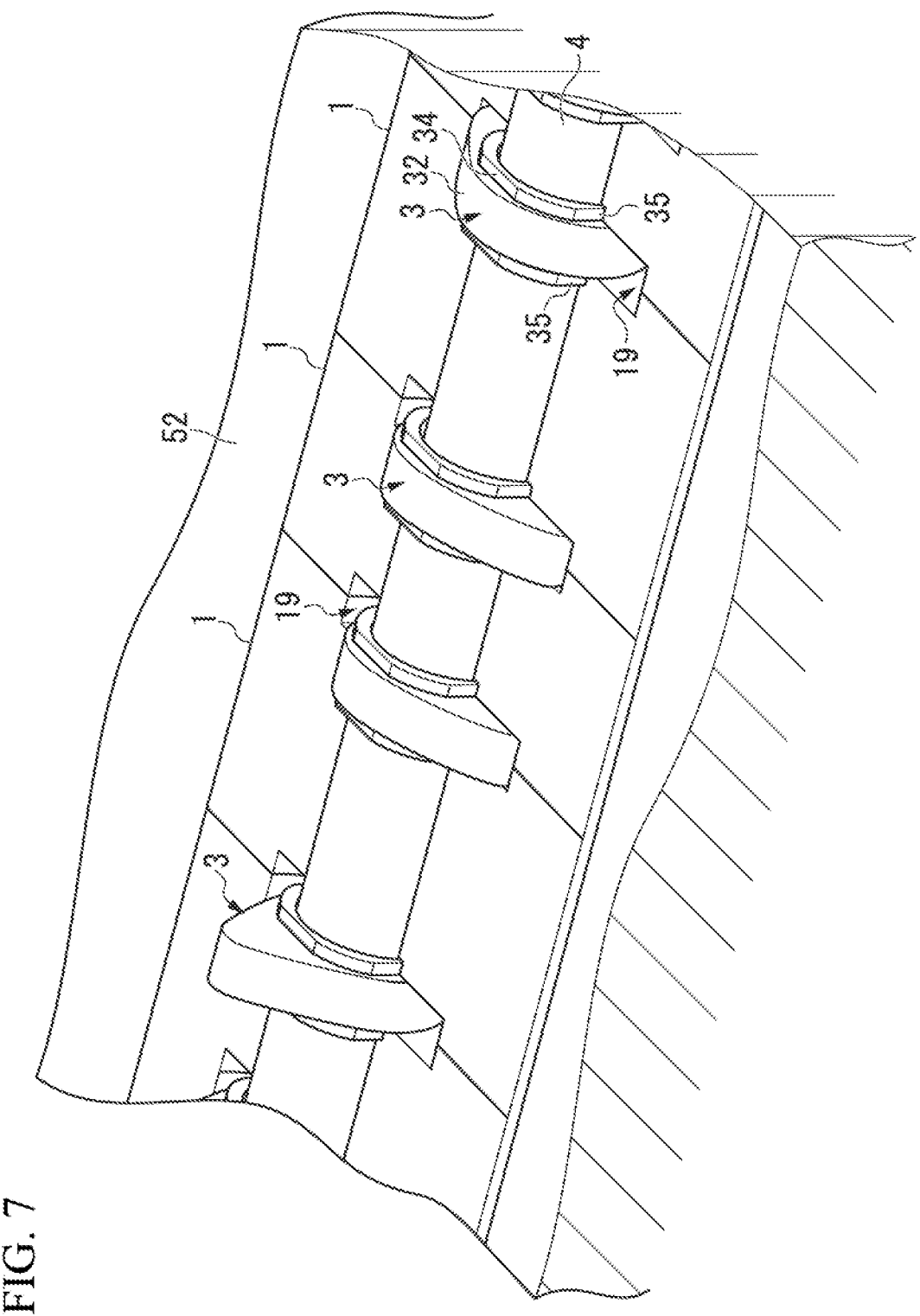
FIG. 7 is a perspective view explaining the camshaft-manufacturing method according to the first embodiment of the present invention.
Figure 8:
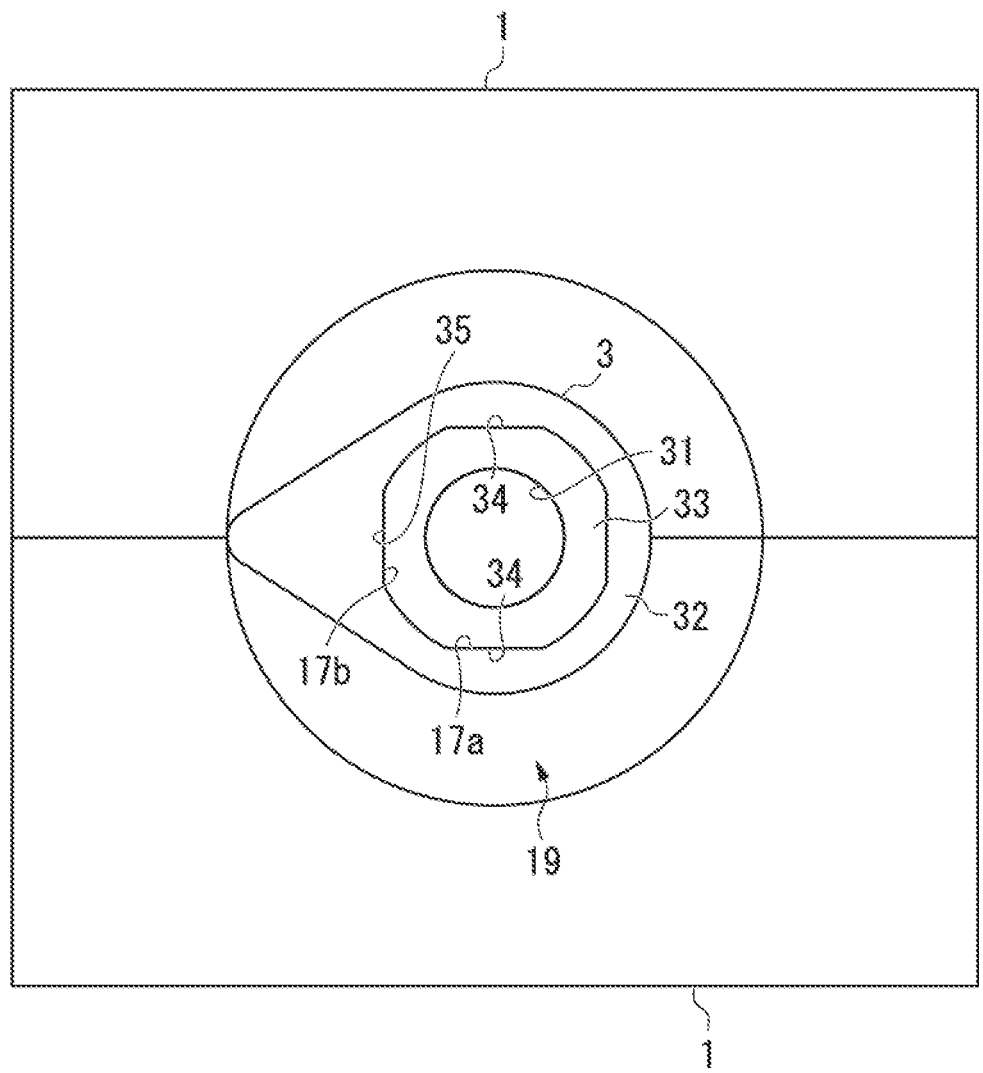
FIG. 8 is a side view explaining the camshaft-manufacturing method according to the first embodiment of the present invention.
Figure 9:
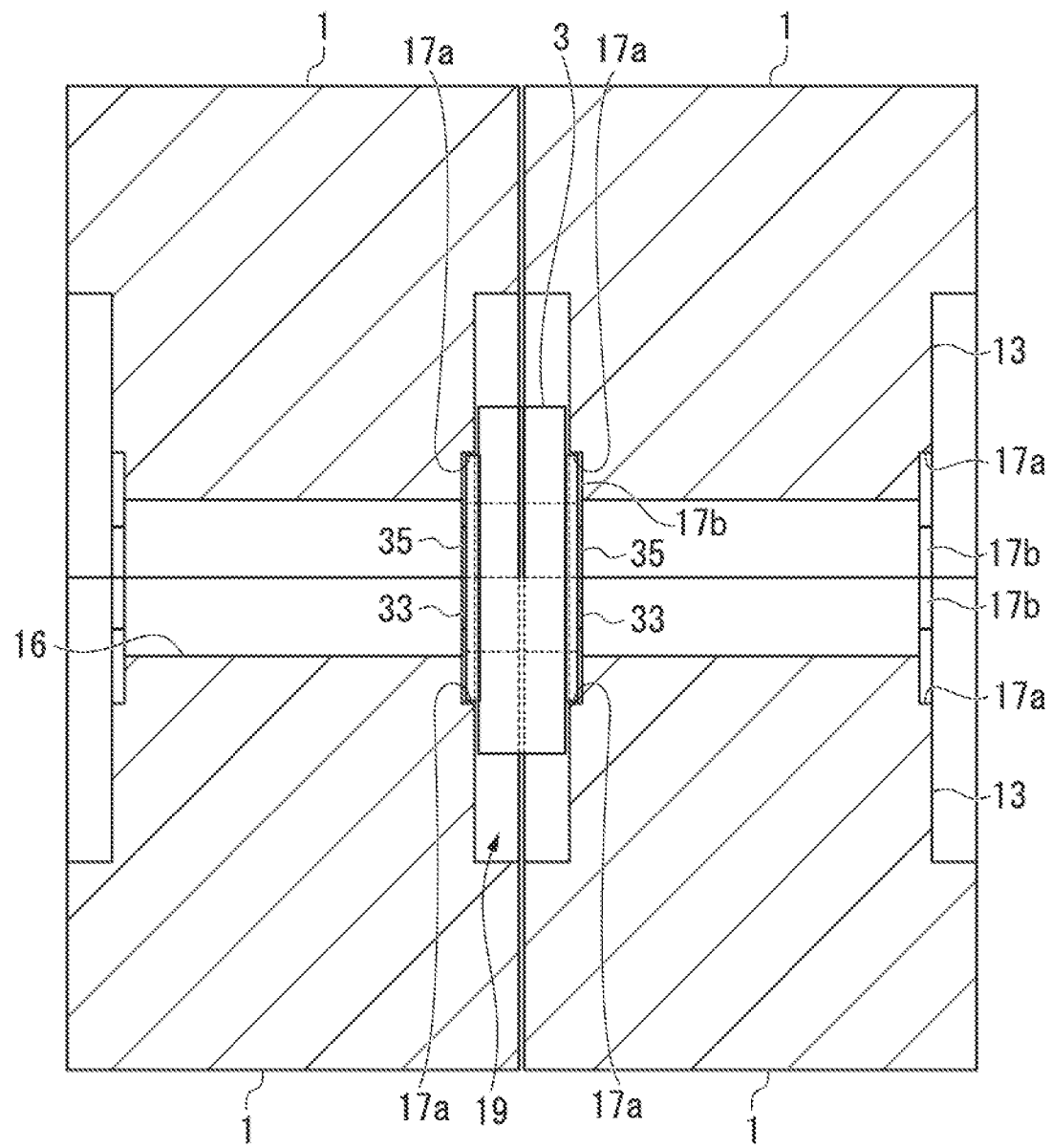
FIG. 9 is a front view explaining the camshaft-manufacturing method according to the first embodiment of the present invention.

Next, as shown in FIGS. 7, 8, and 9, each cam 3 is disposed in the cam accommodation portion 19 of the split die group 12. When the cam 3 is disposed in the cam accommodation portion 19, the cam body 32 is accommodated in the cam accommodation portion 19, and the rib 33 is fitted into the rib accommodation portion 14. More specifically, as shown in FIGS. 8 and 9, the cam body 32 does not come into contact with the split die body 1a in tire cam accommodation portion 19 and is accommodated in the cam accommodation portion 19. In addition, when the rib 33 is fitted into the rib accommodation portion 14, the first abutting surfaces 34 provided on the rib 33 of the cam 3 abut the horizontal surfaces 37a of the rib-receiving surface 17, and the second abutting surfaces 35 provided on the rib 33 of the cam 3 abut the vertical surfaces 17b of the rib-receiving surface 17.

In addition, as shown in FIG. 7, the hollow shaft 4 is inserted into the through-holes 31 of the cams 3. The hollow shaft 4 is inserted into the through-holes 31 of the cams 3, and is fitted into the shaft receiving grooves 16 of the split dies 1.

Figure 10:
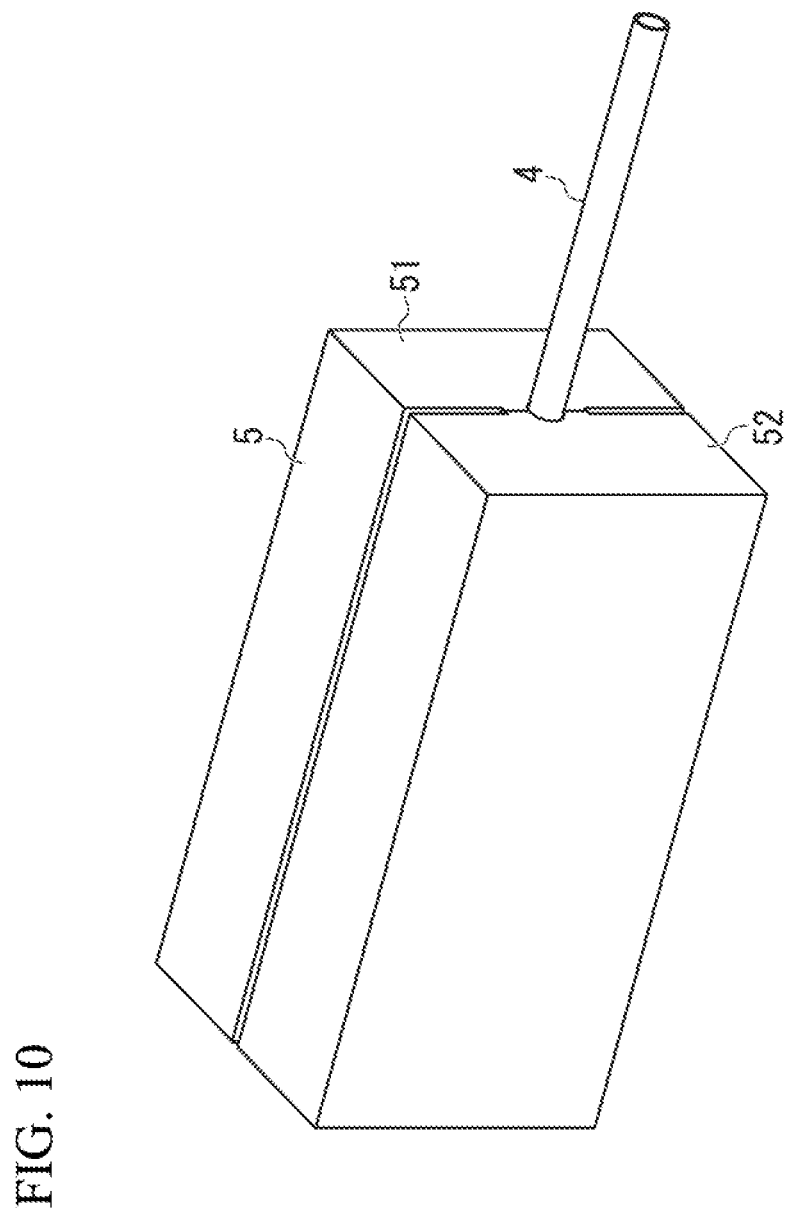
FIG. 10 is a perspective view explaining the camshaft-manufacturing method according to the first embodiment of the present invention.

In addition, as shown in FIGS. 8 and 9, the upper split die group 12b overlaps the lower split die group 12a, and the butting surfaces 15 are butted to each other. Accordingly, similarly to in the lower split die group 12a, the cam body 32 is accommodated in the cam accommodation portion 19 of the upper split die group 12b, and the rib 33 is fitted into the rib accommodation portion 14. Therefore, one cam 3 is fixed by two upper split dies 1 and two lower split dies. The ribs 33 are fitted into the rib accommodation portions 14, and thus, the cams 3 are fixed to the inner portions of the upper and lower split die groups 12a and 12b. In addition, the cam body 32 floats so that the cam body 32 does not come into contact with any split die body 1a. In addition, the upper case 51 shown in FIG. 1 overlaps with the lower case 52, and thus, as shown in FIG. 10, the upper and lower split die groups 12a and 12b are accommodated in the case 5.

(Processing Step)

Figure 11:
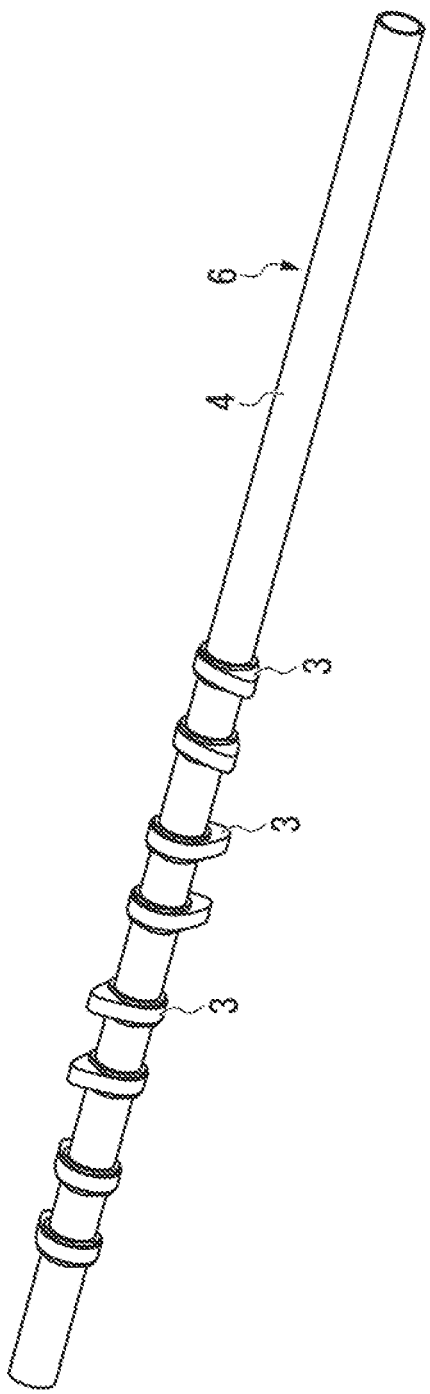
FIG. 11 is a perspective view showing a camshaft which is manufactured by the camshaft-manufacturing method according to the first embodiment of the present invention.

Next, the pressurized fluid is introduced into the hollow portion 41 of the hollow shaft 4, the hydroform processing is performed, and the cams 3 are fixed to the hollow shaft 4 by expanding the hollow shaft 4. For example, as the pressurized fluid, high-pressure water is used. The diameter of the hollow shaft 4 increases by injecting the water into the hollow shaft 4 and pressurizing the water, and thus, the outer circumferential surface of the hollow shaft 4 is pressed to inner surfaces of the through-holes 31 of the cams. Accordingly, the cams 3 and the hollow shaft 4 are fixed to each other. In this way, the camshaft 6 is manufactured. Thereafter, the upper case 51 and, the upper split die group 12b are sequentially removed, and the manufactured camshaft 6 is removed. When the camshaft 6 is removed, the fitting between the ribs 33 and the cams 3 and the rib accommodation portions 14 of the split dies 1 may be released, and since the fitting between the ribs 33 and the rib accommodation portions 14 is generated by the contact, between the horizontal surfaces 17a and the vertical surfaces 17b, and the first and second abutting surfaces 34 and 35, the fitting is released by simply lifting the cams 3 in the vertical direction with respect to the split dies 1. In this way, the camshaft shown in FIG. 11 is manufactured.

As described above, according to the manufacturing method of the camshaft 6 of the present embodiment, since the cam 3 having the cam body 32 which is smaller than the cam accommodation portion 19 is accommodated in the cam accommodation portion 19 of the split die 1, even in the cams 3 in which operation angles with respect to the hollow shaft 4 are different from each other, it is possible to use the same split die 1, and it is not necessary to prepare the split die 1 for each cam 3. In addition, since the cam body 32 does not come into contact with the wall surfaces of the recessed cam accommodation portion 13 partitioning the cam accommodation portion 19, there is no concern that scratches may occur on the sliding surface of the cam 3, and it is not necessary to additionally machine the manufactured camshaft. In addition, since the ribs 33 of the earn 3 are fitted into the rib accommodation portions 14 of the split die 1, it is possible to accurately determine the operation angle of the cams 3 with respect to the hollow shaft 4, and thus, it is possible to manufacture the camshaft 6 having high accuracy in the operation angles of the cams 3 with respect to the hollow shaft 4.

In addition, according to the manufacturing method of the camshaft 6 of the present embodiment, the pair of split die groups 12a and 12b is prepared, the cams 3 and the hollow shaft 4 are fixed in the state where the cams 3 and the hollow shaft 4 are interposed between the pair of split die groups 12 and 12b. Accordingly, it is possible to securely position the hollow shaft 4 and the cams 3, and it is possible to manufacture the camshaft 6 having high accuracy in the operation angles of the cams 3 with respect to the hollow shaft 4.

In addition, according to tire manufacturing method of the camshaft 6 of the present embodiment, since the first and second abutting surfaces 34 and 35 provided on the ribs 33 of the cam 3 abut the plurality of rib-receiving surfaces 17 provided on the rib accommodation portions 14, it is possible to accurately determine the operation angle for each cam 3 with respect to the hollow shaft 4.

Moreover, according to the manufacturing method of the camshaft 6 of the present embodiment, since the plurality of rib-receiving surfaces 17 of the split die 1 are configured of the horizontal surface 17a and the pair of vertical surfaces 17b, and the plurality of abutting surfaces of the rib 33 are configured of the first abutting surfaces 34 abutting the horizontal surface 17a and the second abutting surfaces 35 abutting the vertical surfaces 17b, it is possible to manufacture the camshaft 6 having high accuracy in the operation angles of the cams 3 with respect to the hollow shaft 4. In addition, when the camshaft 6 is removed from the split dies 1, since the camshaft is removed while the vertical surfaces 17b of the rib-receiving surface 17 and the second abutting surfaces 35 slide with respect to each other, it is possible to easily remove the camshaft 6 from the split dies 1.

In addition, in the processing preparation step, since the hollow shaft 4 is inserted into the through-hole of the cams 3 white the cams 3 are mounted on the split die group, it is possible to insert the hollow shaft 4 in a state where the cams 3 are fixed, and thus, it is possible to improve workability.

In addition, in the processing preparation step, when the cams 3 and the hollow shaft 4 are mounted on the split die group after the hollow shaft 4 is inserted into the cams 3, immediately after the cams are mounted on the split die group, it is possible to move the processing to the next step, and thus, it is possible to improve productivity.

Second Embodiment

In addition, the present invention may be also applied to a manufacturing method of a gear shaft having a plurality of gears.

A gear shaft-manufacturing method according to a second embodiment will be described with reference to FIG. 12. In this manufacturing method, similar to the first embodiment, a plurality of split dies 60 are prepared, a split die group is configured by butting side surfaces 61 of the split dies 60, gears 62 are disposed on the split die group, a hollow shaft is inserted into through-holes 81 of the gears 62, the gears 62, the hollow shaft, and the split die group are accommodated in a case including an upper case and a lower case, the pressurized fluid is introduced into a hollow portion of the hollow shaft, the hydroform processing is performed, the gears 62 are fixed to the hollow shaft by expanding the hollow shaft, and thus, a gear shaft in which the plurality of gears 62 are attached to the hollow shaft is manufactured.

Figure 12:
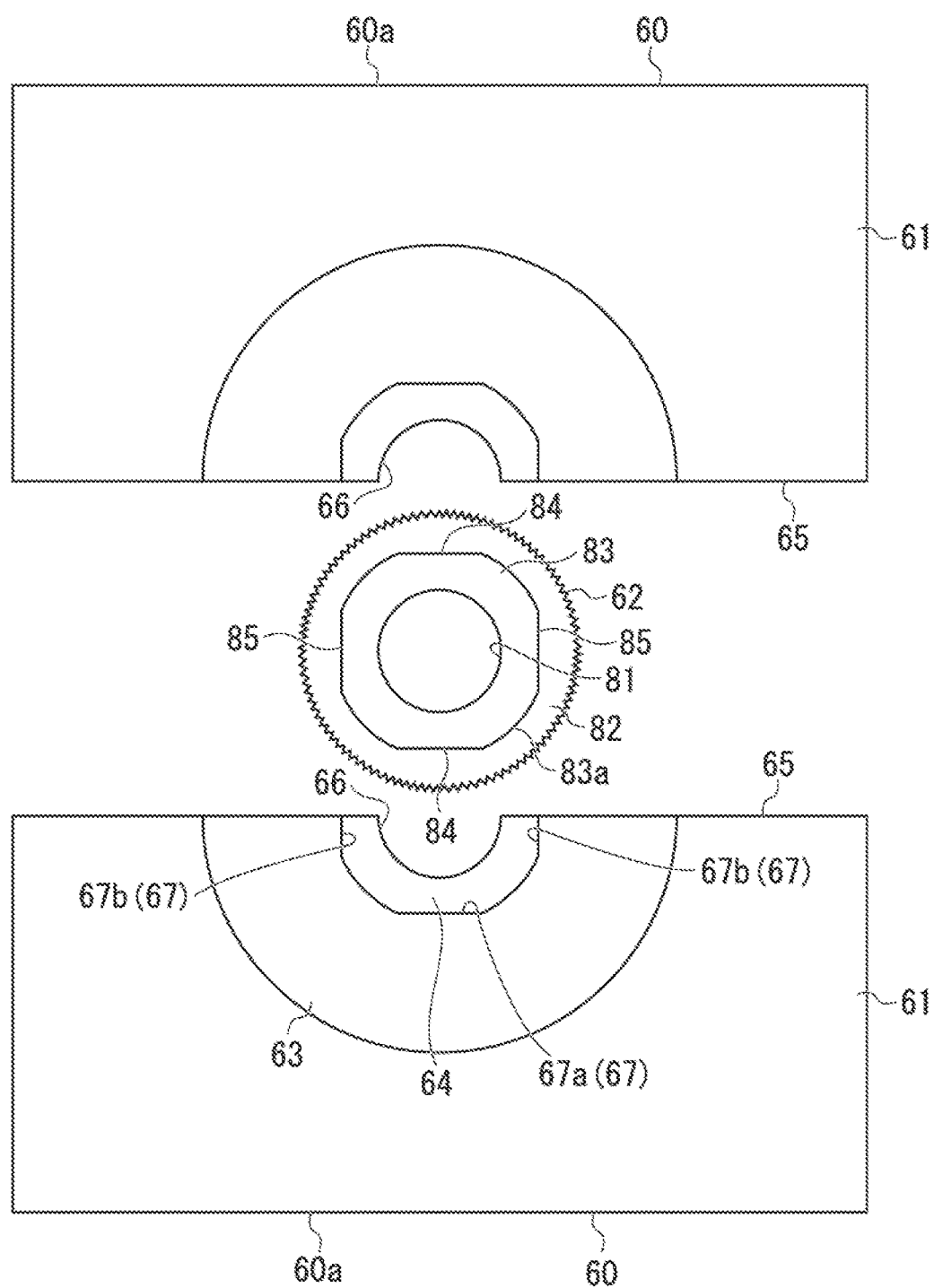
FIG. 12 is a front view explaining a gear shaft-manufacturing method of a second embodiment of the present invention.

As shown in FIG. 12, the gear 62 includes a gear body 82, and ribs 83 which are provided on both sides in a thickness direction of the gear body 82. A round-shaped through-hole 81 in a plan view is provided in the gear body 82, and annular ribs 83 are provided to surround the round-shaped through-hole 81. While an outer circumferential end surface 83a of each of the ribs 83 is partially formed in a cylindrical surface, the other portions are formed of four flat surfaces in which the cylindrical surface is partially cut off. Among the four flat surfaces, surfaces parallel to each other are first abutting surfaces 84, other surfaces parallel to each other are second abutting surfaces 85, and the first and second abutting surfaces 84 and 85 are orthogonal to each other. When each gear 62 is positioned at a position corresponding to an attachment angle with respect to the hollow shaft, the pair of first abutting surfaces 84 is configured so as to be directed in an up-down direction, and the pair of second abutting surfaces 85 is configured so as to be directed to the sides. The gear 62 is formed of steel, an aluminum material or the like.

Moreover, the hollow portion is provided in the hollow shaft. The hollow shaft is configured of a metal pipe such as a steel pipe or an aluminum pipe.

Next, as shown in FIG. 12, in the split die 60, recessed gear accommodation portions 63 and rib accommodation portions 64 are provided on both side surfaces 61 of a split die body 60a formed of metal, and a shaft receiving groove 66 is provided on a butting surface 65 which is an tipper surface of the split die body 60a.

The recessed cam accommodation portions 63 and the rib accommodation portion 64 are provided on the side surface 61 and are provided so as to cut off a portion of the butting surface 65. The recessed cam accommodation portion 63 is integral with the recessed gear accommodation portion 63 of another split die and configures a gear accommodation portion. Since the recessed cam accommodation portion 63 is provided so as to cut off the butting surface 65, when the plurality of split dies 60 are integrated to configure the split die group, the gear accommodation portion is recessed so as to be opened to the butting surface 65. The size of the gear accommodation portion is set so as to accommodate a lower half of the gear 62.

When the plurality of split dies are integrated to configure the split die group, the rib accommodation portion 64 is opened to the butting surface 65 and is recessed to communicate with the gear accommodation portion. An end surface partitioning the rib accommodation portion 64 is configured of a plurality of rib-receiving surfaces 67 in which, while a cylindrical surface is partially formed, the cylindrical surface is partially cut off in other portions. The rib-receiving surface 67 includes a horizontal surface 67a provided on a bottom portion of the rib accommodation portion 64, and a pair of vertical surfaces 67b coming into contact with the butting surface 65.

Next, a manufacturing step of the gear shaft will be described according to procedures thereof. The gear shaft-manufacturing method of the present embodiment includes a split die group preparation step of configuring the split die group by butting the side surfaces 61 of the split die 60, a processing preparation step of disposing the gears 62 in the gear accommodation portions of the split die group and inserting the hollow shaft into the through-holes 81 of the gears 62, and a processing step of introducing the pressurized fluid into the hollow portion of the hollow shaft, performing the hydroform processing, and fixing the gears 62 to the hollow shaft by expanding the hollow shaft.

(Split Die Group Preparation Step)

Similar to the camshaft-manufacturing method of the first embodiment, the lower split die group is configured by butting the plurality of split dies 60. The recessed gear accommodation portions 63 are integrated between the split dies 60, and thus, the gear accommodation portion is formed. The size of the gear accommodation portion is set so as to accommodate the lower half of the gear 62. In addition, the gear 62 corresponding to each cam accommodation portion is prepared.

(Processing Preparation Step)

Next, each gear 62 is disposed in the gear accommodation portion of the split die group. When the gear 62 is disposed in the gear accommodation portion, the gear body 82 is accommodated in the gear accommodation portion, and the rib 83 is fitted into the rib accommodation portion 64. When the rib 83 is fitted into the rib accommodation portion 64, the first abutting surfaces 84 provided on the rib 83 abut the horizontal surfaces 67a of the rib-receiving surface 67, and the second abutting surfaces 85 provided on the rib 83 abut the vertical surfaces 67b of the rib-receiving surface 67.

In addition, the hollow shaft is inserted into the through-holes 81 of the gears 62. The hollow shaft is inserted into the through-holes 81 of the gears 62, and is fitted into the shaft receiving grooves 66 of the split dies 60.

Moreover, the upper split die group overlaps the lower split die group. The upper case overlaps the lower case, and thus, the upper and lower split die groups are accommodated in the case.

(Processing Step)

Next, the pressurized fluid is introduced into the hollow portion of the hollow shaft, the hydro form processing is performed, and the gears 62 are fixed to the hollow shaft by expanding the hollow shaft. In this way the gear is manufactured. Thereafter, the upper case and the upper split die group are sequentially removed, and the manufactured gear shaft is extracted. When the gear shaft is extracted, the fitting between the ribs 83 of the gears 62 and the rib accommodation portions 64 of the split dies 60 may be released, and the fitting is released by simply lifting the gears 62 in the vertical direction with respect to the split dies 60. In this way, the gear shaft is manufactured.

According to the gear shaft-manufacturing method, when the gear 62 having the gear body 82 which is smaller than the gear accommodation portion is disposed in the gear accommodation portion of the split die 60, since the gear body 82 is accommodated in the gear accommodation portion, even in the gears 62 in which attachment angles with respect to the hollow shaft are different from each other, it is possible to use the same split die, and it is not necessary to prepare the split die for each gear. In addition, since the gear body 82 does not come into contact with the wall surfaces of the recessed gear accommodation portion 63 partitioning the gear accommodation portion, there is no concern that scratches may occur on the gear 62, and it is not necessary to additionally machine the manufactured gear shaft. In addition, since the ribs 83 of the gear 62 are fitted into the rib accommodation portions 64 of the split die 60, it is possible to accurately determine the attachment angle of the gear 62 with respect to the hollow shaft, and thus, it is possible to increase accuracy in the mounting of the gear 62 with respect to the hollow shaft.

In addition, in the present embodiment, the hollow shaft is inserted into the through-holes 81 of the gears 62 after the gears 62 are disposed in the split die group. However, the present invention is not limited to this, and after the hollow shaft is inserted into the through-holes 81 of the gears 62 and the gears 62 and the hollow shaft are combined with each other, the combined gears 62 and the hollow shaft may be disposed in the split die group.

Third Embodiment

Next, a camshaft-manufacturing method according to a third embodiment of the present invention will be described with reference to the drawings.

The camshaft-manufacturing method according to the present embodiment is approximately the same as the camshaft-manufacturing method of the first embodiment, and differences between the present embodiment and the first embodiment are that tire rib-receiving surfaces of the split die are configured of inclined surfaces, and the abutting surfaces of the rib of the cam side are configured of third abutting surfaces abutting the inclined surfaces. Hereinafter, the main differences therebetween will be described. In addition, the same reference numerals as those of the first embodiment are assigned to the same components as those described in the first embodiment, and descriptions thereof are omitted.

Figure 13:
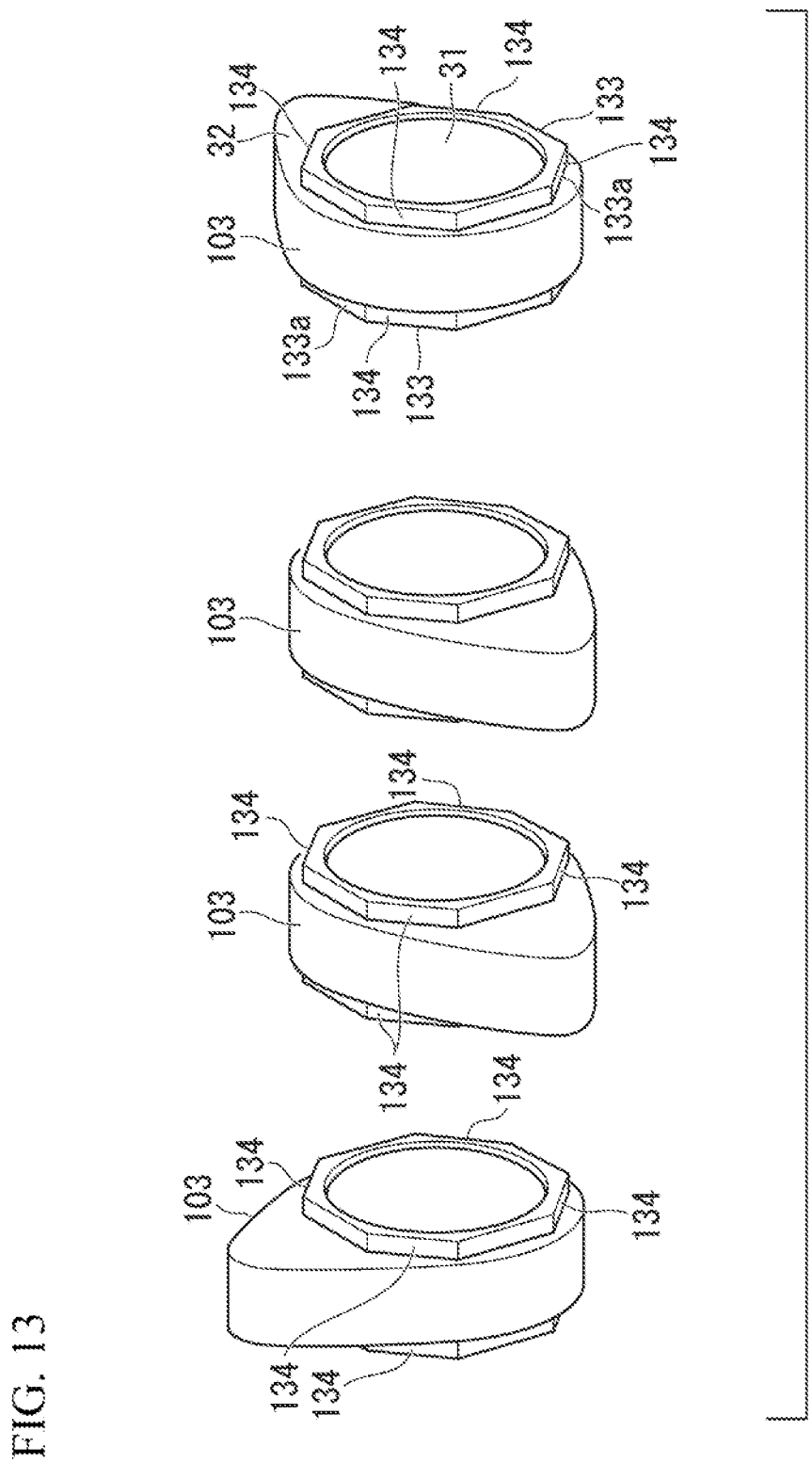
FIG. 13 is a perspective view showing a cam which is used in a camshaft-manufacturing method according to a third embodiment of the present invention.
Figure 15:
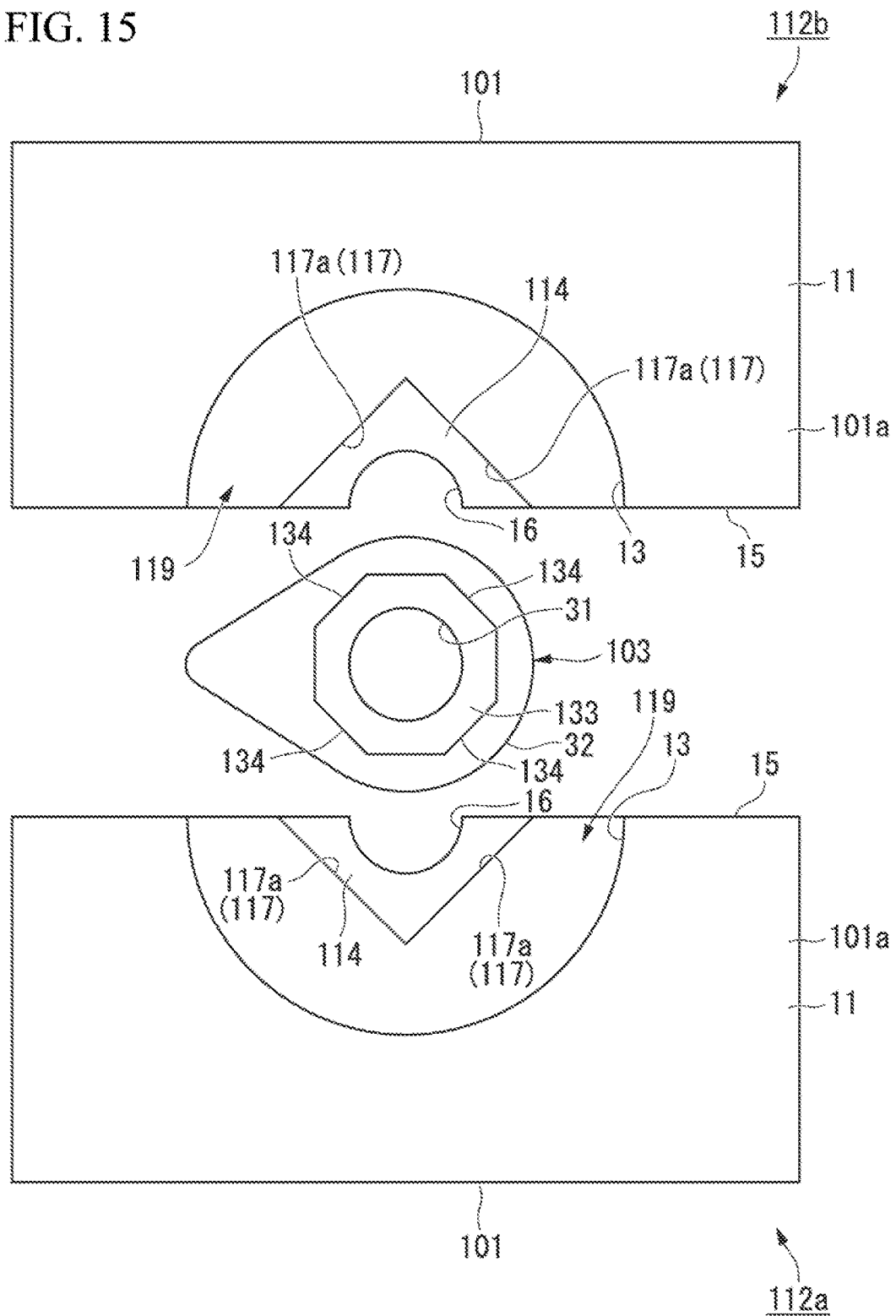
FIG. 15 is a side view showing the cam and the split die which are used in the camshaft-manufacturing method according to the third embodiment of the present invention.
Figure 16:
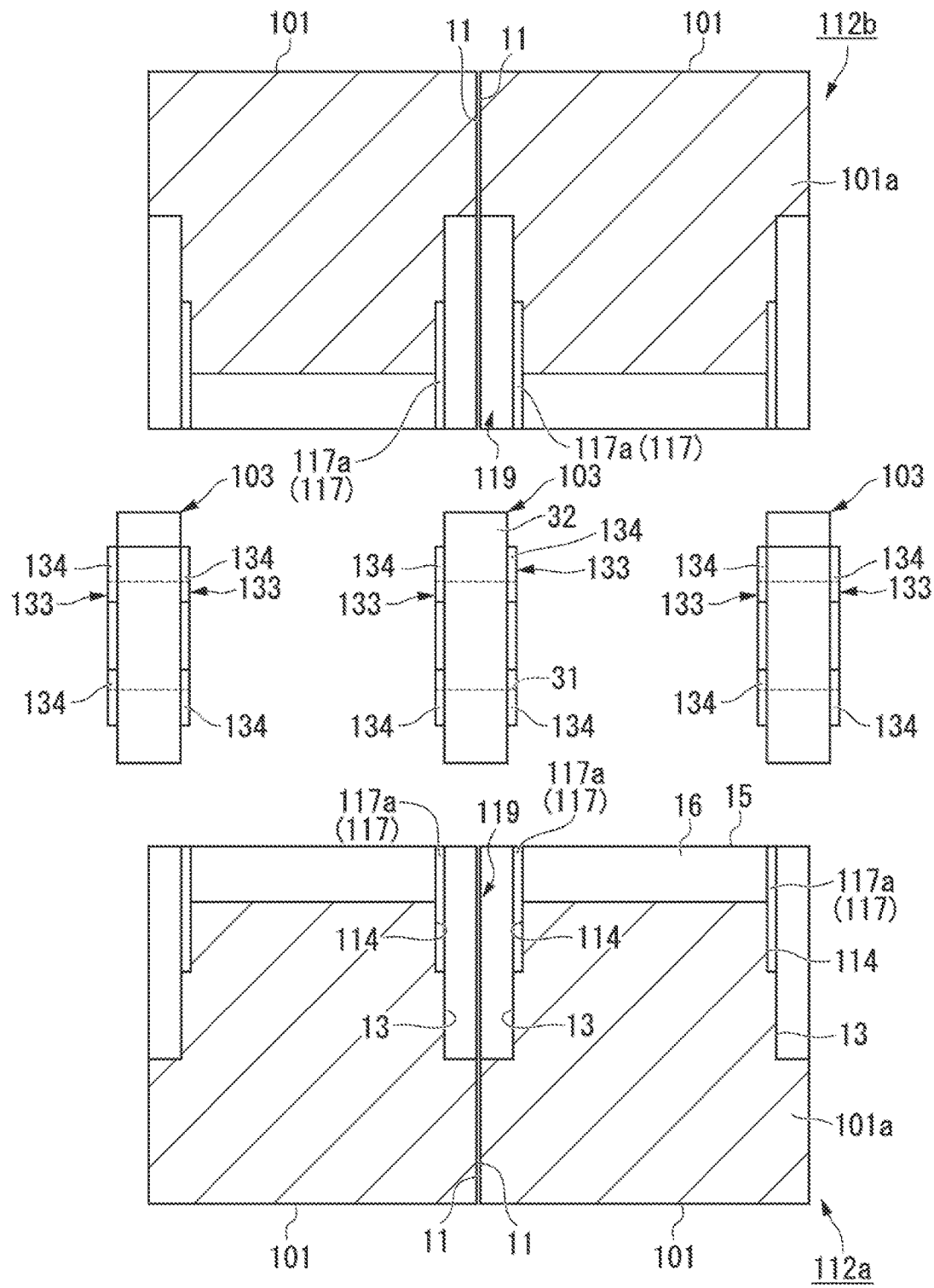
FIG. 16 is a front view showing the cam and the split, die which are used in the camshaft-manufacturing method according to the third embodiment of the present invention.

As shown in FIGS. 13, 15, and 16, each cam 103 includes the cam body 32, and ribs 133 which are provided on both sides in the thickness direction of the cam body 32. A round-shaped through-hole 31 in a plan view is provided in the cam body 32, and annular ribs 133 are provided to surround the round-shaped through-hole 31. An outer circumferential end surface 133a of each of the ribs 133 is configured of eight flat surfaces, and the outline of the rib 133 is octagonal when viewed in a plan view. When each cam 103 is positioned at a position corresponding to an operation angle with respect to the hollow shaft 4, the eight flat, surfaces configuring the outer circumferential end surface 133a are divided into horizontal surfaces, vertical surfaces, and inclined surfaces, and among these, the inclined surfaces are third abutting surfaces 134. The cam 103 is formed of steel, an aluminum material, or the like.

Figure 14:
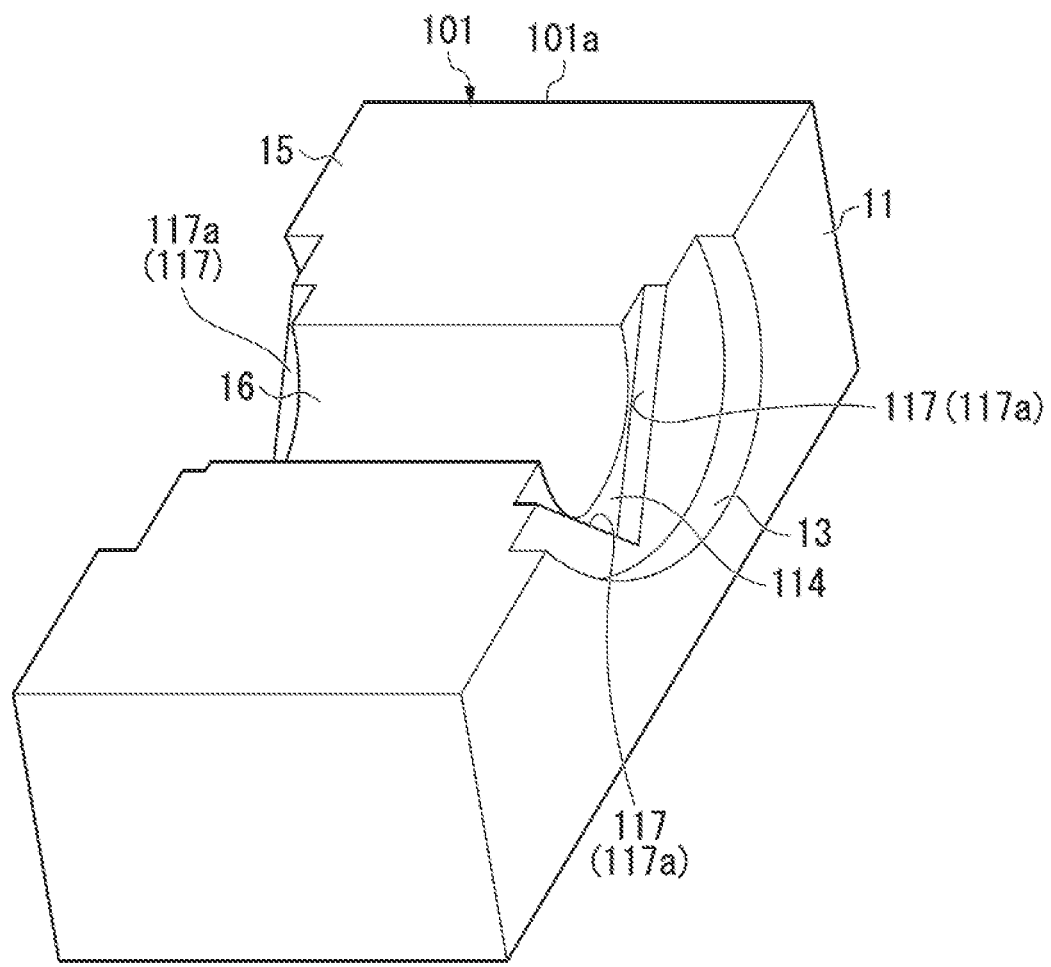
FIG. 14 is a perspective view showing a split die which is used in the camshaft-manufacturing method according to the third embodiment of the present invention.

Next, as shown in FIGS. 14, 15, and 16, in the split die 101, recessed cam accommodation portions 13 and rib accommodation portions 114 are provided on both side surfaces 11 of a split die body 101a formed of metal, and the shaft receiving groove 16 is provided on a butting surface 15 which is the upper surface of the split die body 101a.

Each of the recessed cam accommodation portions 13 is provided on the side surface 11 and is provided so as to cut off a portion of the butting surface 15. The recessed cam accommodation portion 13 is integral with the recessed cam accommodation portion 13 of another split die 101 to configure a cam accommodation portion 119. Since the recessed cam accommodation portion 13 is provided so as to cut off the butting surface 15, when the plurality of split dies 101 are integrated to configure a split die group 112, the cam accommodation portion 119 is recessed so as to be opened to the butting surface 15. The size of the cam accommodation portion 119 is set so as to accommodate a lower half of the cam 103.

The rib accommodation portion 114 is provided inside the recessed cam accommodation portion 13 and is provided so as to further cut off the recessed cam accommodation portion 13. In addition, the rib accommodation portion 114 is provided to cut off the butting surface 15. Accordingly, when the plurality of split dies 101 are integrated to configure the split die group 112, the rib accommodation portion 114 is opened the butting surface 15 and is recessed to communicate with the cam accommodation portion 119. An end surface partitioning the rib accommodation portion 114 is configured of a rib-receiving surface 117 which receives the rib 133 of the cam 103. The rib-receiving surface 117 is configured of a pair of inclined surfaces 117a. The inclined surfaces 117a are configured so that a gap between the inclined surfaces is gradually increased toward the butting surface 15. In other words, when viewed from the side surface 11 side of the split die 101, the pair of inclined surfaces 117a is disposed so as to form a V shape.

Next, a manufacturing step of a camshaft will be described according to procedures thereof. The camshaft-manufacturing method of the present embodiment includes a split die group preparation step of configuring the split die group 112 by butting the side surfaces 11 of the split die 101, a processing preparation step of disposing, the cams 103 in the cam accommodation portions 119 of the split die group 112 and inserting the hollow shaft (not shown) into the through-holes 31 of the cams 103, and a processing step of introducing the pressurized fluid into the hollow portion of the hollow shaft, performing the hydroform processing, and fixing the cams 3 to the hollow shaft by expanding the hollow shaft.

In addition, when the cams 103 and the hollow shaft are disposed on the split die group 112, as described below, the hollow shaft may be inserted into the through-holes 31 of the cams 103 after the cams 103 are disposed on the split die group 112. However, the present invention is not limited to this, and after the hollow shaft is inserted into the through-holes 31 of the cams 103 and the cams 103 and the hollow shaft are combined with each other, the combined earns 103 and the hollow shaft may be disposed on the split die group 112.

(Split Die Group Preparation Step)

As shown in FIGS. 15 and 16, the plurality of split dies 101 are prepared, the split dies 101 are arranged so that the side surfaces 11 of the split dies 101 are butted to each other and the butting surfaces 15 configure the same surface, and thus, a lower split die group 112a is configured. The lower split die group 112a may be accommodated in the split die accommodation portion 55 of the lower case 52 shown in FIG. 1. In this case, the recessed cam accommodation portions 13 of the split dies 101 are integrated between the split dies 101, and thus, the cam accommodation portion 119 is formed. The size of the cam accommodation portion 119 is set so as to accommodate the lower half of the cam 103 even when the cam 103 is positioned in any state. For example, when the shape of the cam accommodation portion 119 is set so as to be a semicircular round-groove shape, the width of the round groove is set so as to exceed the long-axis length of the cam. In addition, the rib accommodation portions 114 are positioned on both sides of the cam accommodation portion 119 along the arrangement direction of the split dies 101. In addition, the cam 103 corresponding to each cam accommodation portion 119 is prepared.

(Processing Preparation Step)

Next, as shown in FIGS. 15 and 16, each cam 103 is disposed in the cam accommodation portion 119 of the split die group 112a. When the cam 103 is disposed in the cam accommodation portion 119, the cam body 32 is accommodated in the cam accommodation portion 119, and the rib 133 is fitted into the rib accommodation portion 114. More specifically, the cam body 32 does not come into contact with the split die body 101a in the cam accommodation portion 119 and is accommodated in the cam accommodation portion 119. In addition, when the rib 133 is fitted into the rib accommodation portion 114, the third abutting surfaces 134 provided on the rib 133 of the cam 103 abut the inclined surfaces 117a of the rib-receiving surface 117.

Next, the hollow shaft (not shown) is inserted into the through-holes 31 of the cams 103. The hollow shaft is inserted into the through-holes 31 of the cams 103, and is fitted into the shaft receiving grooves 16 of the split dies 101.

Figure 17:
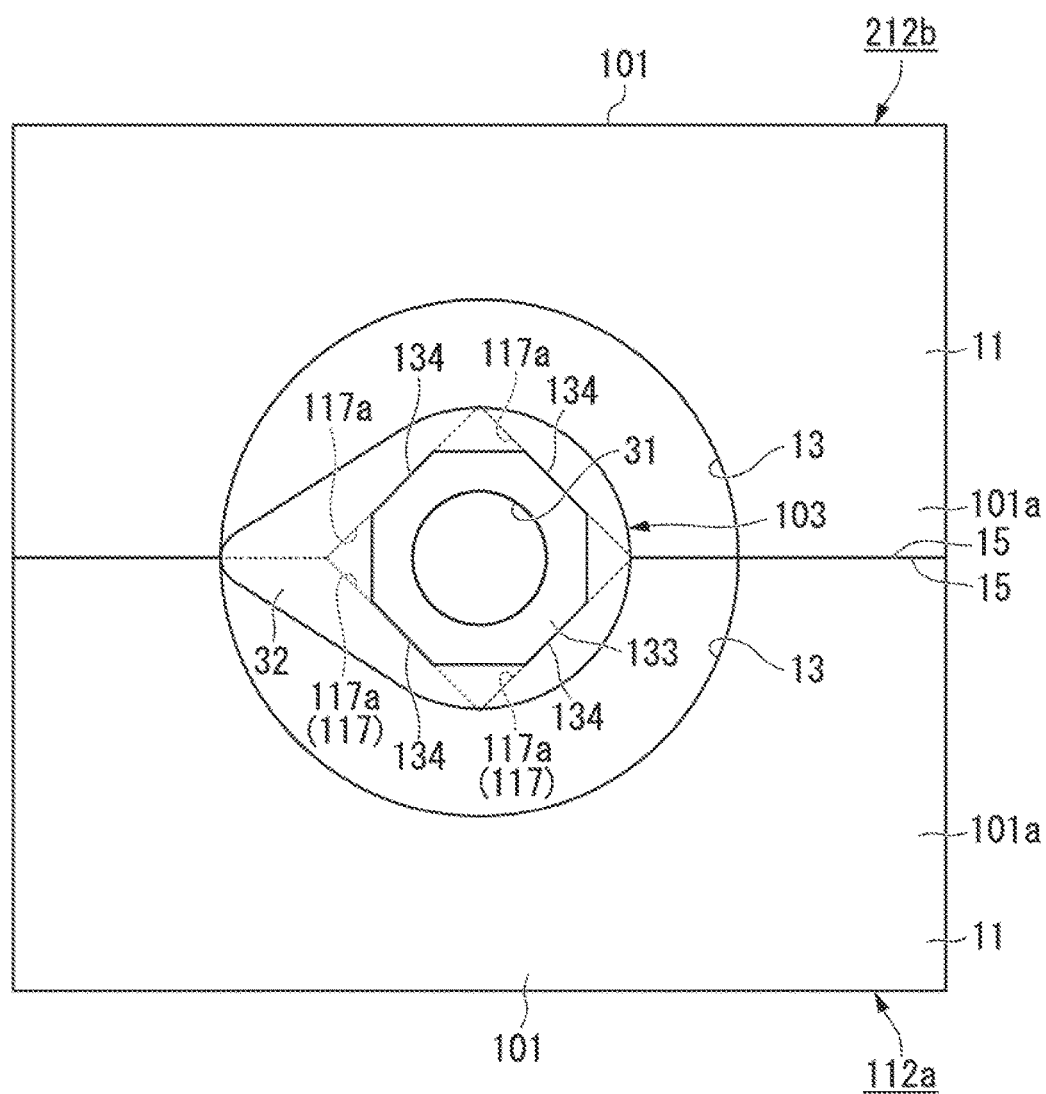
FIG. 17 is a side view explaining the camshaft-manufacturing method according to the third embodiment of the present invention.
Figure 18:
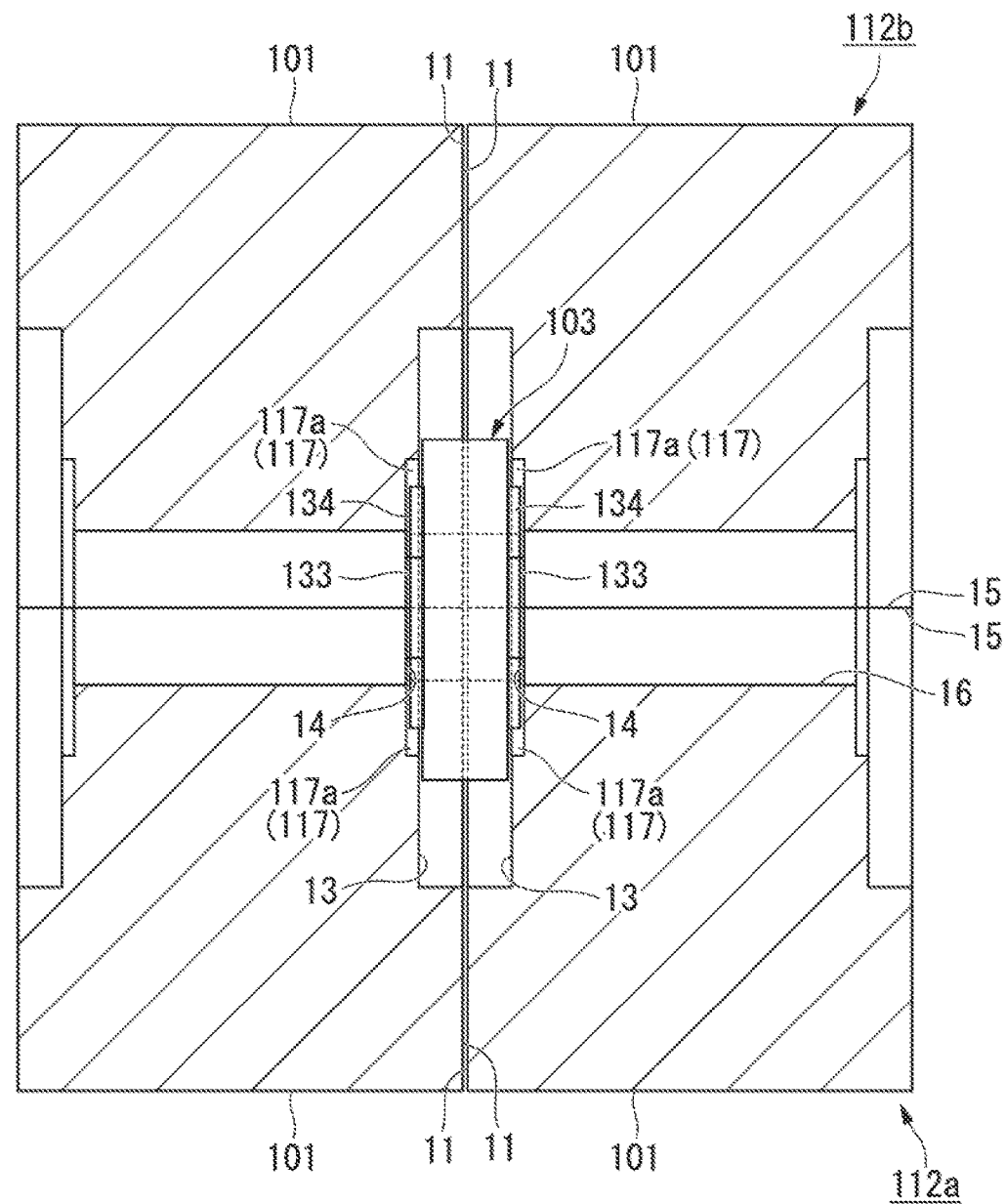
FIG. 18 is a front view explaining the camshaft-manufacturing method according to the third embodiment of the present invention.

In addition, as shown in FIGS. 17 and 18, an upper split die group 112b overlaps the lower split die group 112a, and die butting surfaces 15 are butted to each other. Accordingly, similarly to in the lower split die group 112a, the cam body 32 is accommodated in the cam accommodation portion 119 of the upper split die group 112b, and the rib 133 is fitted into the rib accommodation portion 114. Therefore, one cam 103 is fixed by two upper split dies 101 and two lower split dies 101. The ribs 133 are fitted into the rib accommodation portions 114, and thus, the cams 103 are fixed to the inner portions of the upper and lower split die groups 112a and 112b. In addition, the cam body 32 floats so that the cam body 32 does not come into contact with any split die body 101a. In addition, as shown in FIG. 1, the upper case 51 overlaps with the lower case 52, and thus, as shown in FIG. 10, the upper and lower split die groups 112a and 112b are accommodated in the case 5.

(Processing Step)

Next, the pressurized fluid is introduced into the hollow portion of the hollow shaft, the hydroform processing is performed, and the cams 103 are fixed to the hollow shaft by expanding the hollow shaft. In this way, the camshaft is manufactured. Thereafter, the upper case 51 and the upper split die group 112b are sequentially removed, and the manufactured camshaft is extracted. When the camshaft is extracted, the fitting between the ribs 133 of the cams 103 and the rib accommodation portions 114 of the split dies 101 may be released. Since the fitting between the ribs 133 and the rib accommodation portions 114 is generated by the contact between the inclined surfaces 134a and 177a, the fitting is released by simply lifting the cams 103 in the vertical direction with respect to the split dies 101. In this way, the camshaft is manufactured.

As described above, according to the camshaft-manufacturing method of the present embodiment, in addition to the effects of the first embodiment, the following effects are obtained.

When the ribs 133 of the cams 103 are fitted into the rib accommodation portions 114 of the split, dies 101, the third abutting surfaces 134 of the ribs 133 of the cam 103 sides are fitted into the pair of inclined surfaces 117a partitioning the rib accommodation portions 114. The pair of inclined surfaces 117a are configured so as to be separated from each other toward the butting surface 15, and in other words, since the pair of inclined surfaces 117a is disposed in a V shape when viewed from the side surface 11, it is possible to simultaneously perform positioning in the horizontal direction and the up-down direction, and it is possible to accurately determine the operation angles of the cams 103 with respect to the hollow shaft. Accordingly, it is possible to manufacture the camshaft having high accuracy in the operation angles of the cams 103 with respect to the hollow shaft.

In addition, since the pair of inclined surfaces 117a is disposed so as to be separated from each other toward the butting surface 15 and the third abutting surfaces 134 of the ribs 133 of the earn 103 sides abut the inclined surfaces 117a, when the camshaft is extracted from the lower split die group 112a after the upper split die group 112b is removed, it is possible to easily extract the camshaft by simply lifting the cams 103.

Fourth Embodiment

Next, a camshaft-manufacturing method according to a fourth embodiment of the present invention will be described with reference to the drawings.

The camshaft-manufacturing method according to the present embodiment is approximately the same as the camshaft-manufacturing method of the third embodiment, and differences between the present embodiment and the third embodiment are that the rib-receiving surfaces of the lower split die group are configured of inclined surfaces, the rib-receiving surfaces of the upper split die group are configured of horizontal surfaces, and the abutting surfaces of the ribs of the cam side are configured of third abutting surfaces abutting the inclined surfaces and fourth abutting surfaces abutting horizontal surfaces. Hereinafter, the main differences therebetween will be described. In addition, the same reference numerals as those of the first and third embodiments are assigned to the same components as those described in the first and third embodiments, and descriptions thereof are omitted.

Figure 19:
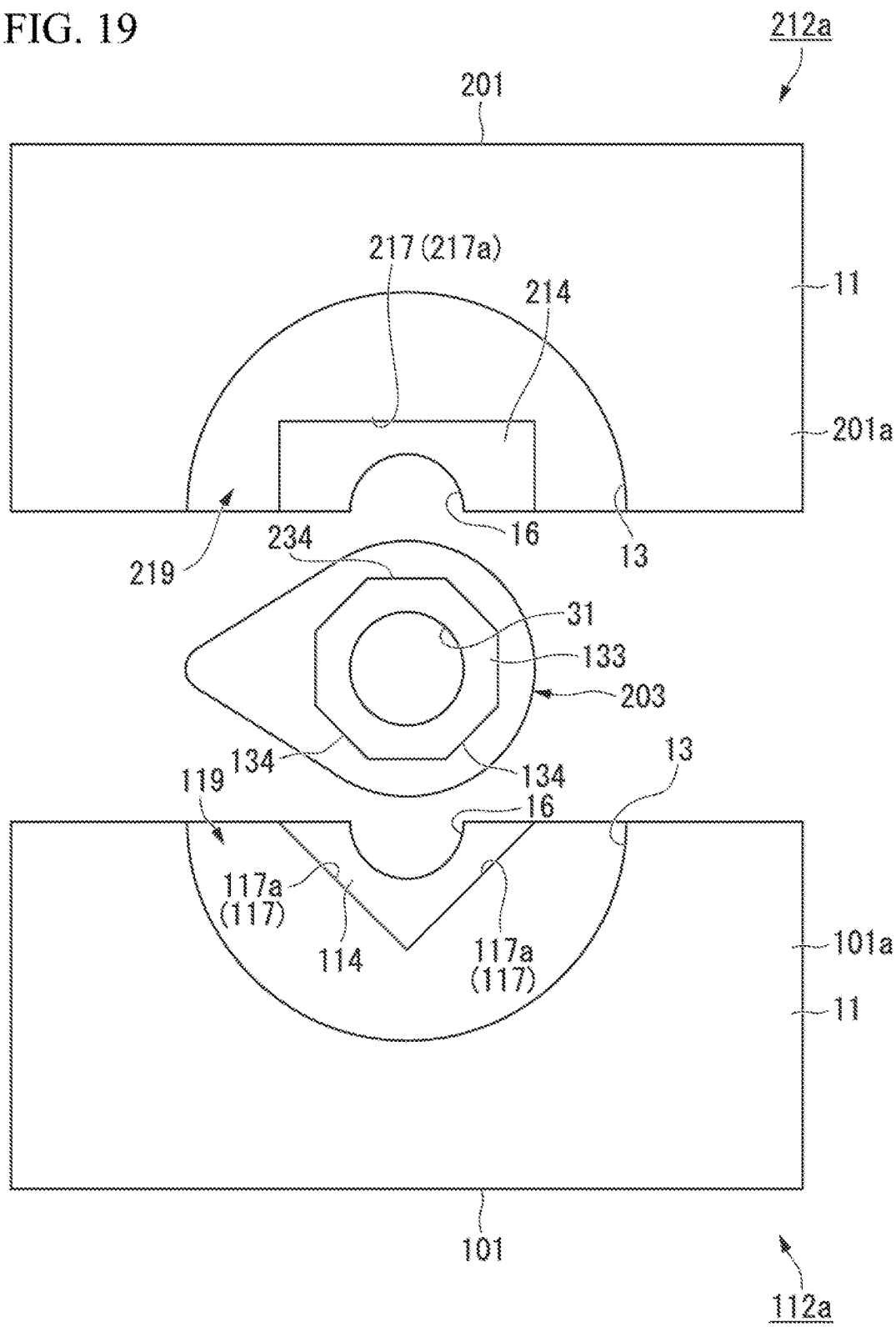
FIG. 19 is a side view showing a cam and a split die which are used in a camshaft-manufacturing method according to a fourth embodiment of the present invention.
Figure 20:
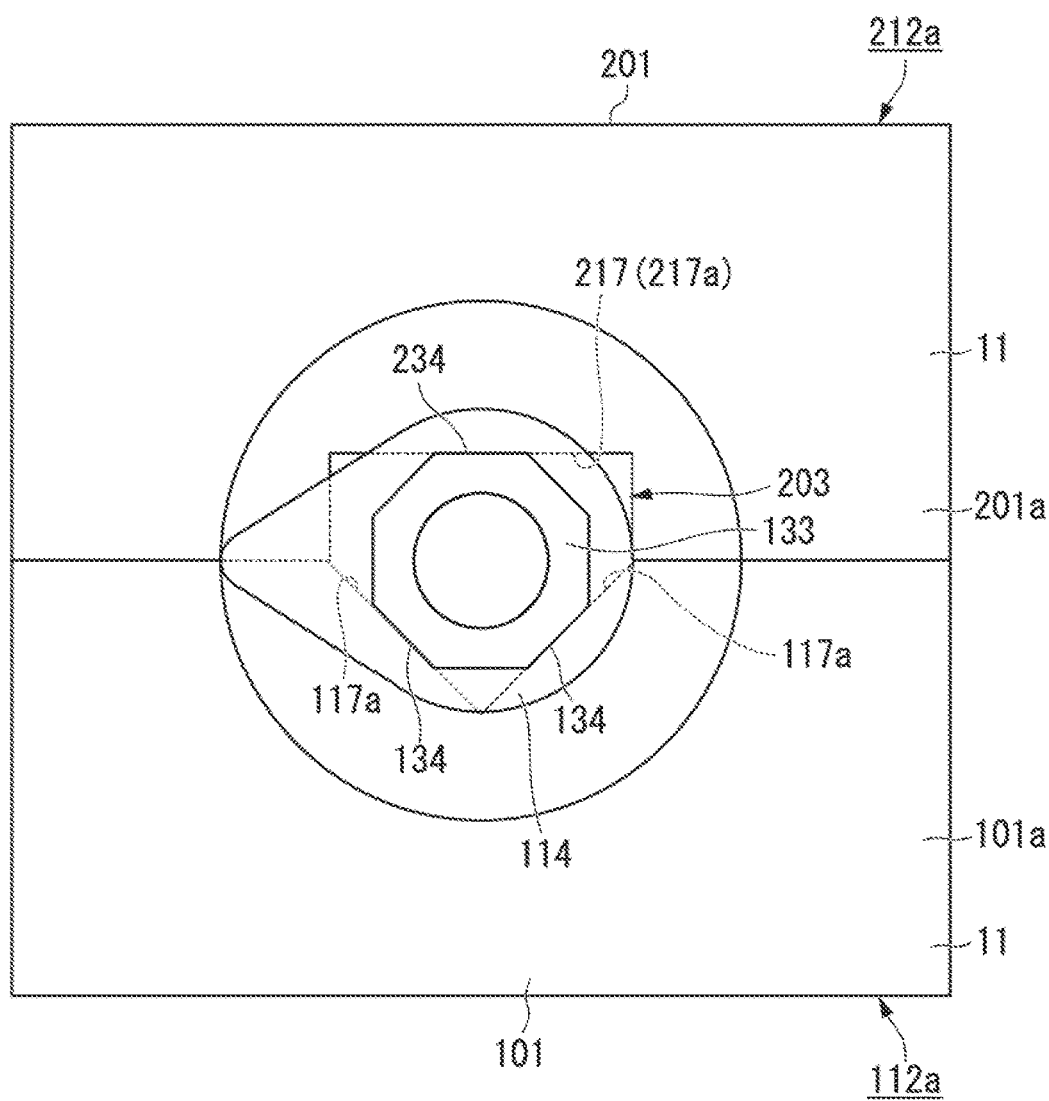
FIG. 20 is a side view explaining the camshaft-manufacturing method according to the fourth embodiment of the present invention.

As shown in FIG. 19, a cam 203 of the present embodiment includes the cam body 32, and ribs 133 which are provided on both sides in the thickness direction of the cam body 32. The outer circumferential end surface 133a of each of the ribs 133 is configured of eight flat surfaces, and the outline of the rib 133 is octagonal when viewed in a plan view. When each cam 203 is positioned at a position corresponding to an operation angle with respect to the hollow shaft 4, fire eight flat surfaces configuring the outer circumferential end surface 133a are divided into horizontal surfaces, vertical surfaces, and inclined surfaces, and among these, the inclined surfaces are the third abutting surfaces 134, and the horizontal surfaces are fourth abutting surfaces 234. The cam 203 is formed of steel, an aluminum material, or the like.

Next, as shown in FIG. 19, in the upper split die 201, the recessed cam accommodation portions 13 and rib accommodation portions 214 are provided on both side surfaces 11 of a split die body 201a formed of metal, and the shaft receiving groove 16 is provided on the butting surface 15 which is the upper surface of the split die body 201a.

Each of the recessed cam accommodation portions 13 is provided on the side surface 11 and is provided so as to cut off a portion of the butting surface 15. The recessed cam accommodation portion 13 is integral with the recessed cam accommodation portion 13 of another split die 1 and configures a cam accommodation portion 219. Since the recessed cam accommodation portion 13 is provided so as to cut off the butting surface 15, when the plurality of split dies 201 are integrated to configure a split die group 212, the cam accommodation portion 219 is recessed so as to be opened to the butting surface 15. The size of the can accommodation portion 219 is set so as to accommodate the upper half of the cam 3.

The rib accommodation portion 214 is provided inside the recessed cam accommodation portion 13 and is provided so as to further cut off the recessed cam accommodation portion 13. In addition, the rib accommodation portion 214 is provided to cut off the butting surface 15. Accordingly, when the plurality of split dies 201 are integrated to configure the split die group 212, the rib accommodation portion 214 is opened to the butting surface 15 and is recessed to communicate with the cam accommodation portion 219. One of the end surfaces partitioning the rib accommodation portion 214 is configured of a rib-receiving surface 217 winch receives the rib 233 of the earn 203. The rib-receiving surface 217 is configured, of a horizontal surface 217a.

The lower split die 101 shown in FIG. 19 is the same as the split die 101 of the third embodiment.

Next, a manufacturing step of a camshaft will be described according to procedures. The camshaft-manufacturing method of the present embodiment includes a split die group preparation step of configuring the lower split die group 112a by butting the side surfaces 11 of the lower split die 101 and configuring the upper split die group 212a by butting the side surfaces 11 of the upper split die 201, a processing preparation step of disposing the cams 203 in the cam accommodation portions 119 of the split die group 112a and inserting the hollow shaft into the through-holes 31 of the cams 203, and a processing step of introducing the pressurized fluid info the hollow portion of the hollow shaft, performing the hydroform processing, and fixing die cams 203 to the hollow shaft by expanding the hollow shaft.

When the cams 203 and the hollow shaft are disposed on the split die group 112a, as described below, the hollow shaft may be inserted into the through-holes 31 of the cams 203 after the cams 203 are disposed on the split die group 112a. However, the present invention is not limited to this, and after the hollow shaft is inserted into the through-holes 31 of the cams 203 and the cams 203 and the hollow shaft are combined with each other, the combined cams 203 and the hollow shaft may be disposed on the split die group 112a.

(Split Die Group Preparation Step)

As shown in FIG. 19, the plurality of split dies 101 are prepared, and the split dies 101 are arranged so that the side surfaces 11 of die split dies 101 are butted to each other and the butting surfaces 15 configure the same surface, and thus, the lower split die group 112a is configured. The lower split die group 112a may be accommodated in the split die accommodation portion 55 of the lower case 52 shown in FIG. 1. In this case, the recessed cam accommodation portions 13 of the split dies 101 are integrated between the split dies 101, and thus, the earn accommodation portion 119 is formed. The size of the cam accommodation portion 119 is set so as to accommodate the lower half of the cam 203 even when the cam 203 is positioned in any state. For example, when the shape of the cam accommodation portion 119 is set so as to be a semicircular round-groove shape, the width of the round groove is set so as to exceed the long-axis length of the cam. In addition, the rib accommodation portions 114 are positioned on both sides of the cam accommodation portion 119 along the arrangement direction of the split dies 101. In addition, the cam 203 corresponding to each cam accommodation portion 119 is prepared.

(Processing Preparation Step)

Next, as shown in FIG. 19, each cam 203 is disposed in the cam accommodation portion 119 of the split die group 112a. When the cam 203 is disposed in the cam accommodation portion 119, the cam body 32 is accommodated in the cam accommodation portion 119, and the rib 133 is fitted into the rib accommodation portion 114. More specifically, the cam body 32 does not come into contact with the split die body 101a in the cam accommodation portion 119 and is accommodated in the cam accommodation portion 119. In addition, when the rib 133 is fitted into the rib accommodation portion 114, the third abutting surfaces 134 provided on the rib 133 of the cam 203 abut the inclined surfaces 117a of the rib-receiving surface 117.

Next, the hollow shall (not shown) is inserted into the through-holes 31 of the cams 203. The hollow shaft is inserted into the through-holes 31 of the cams 203, and is fitted into the shaft receiving grooves 16 of the split dies 101.

In addition, as shown in FIGS. 17 and 18, an upper split die group 212a overlaps the lower split, die group 112a, and the butting surfaces 15 are butted to each other. Accordingly, the cam body 32 is accommodated in the cam accommodation portion 219 of the upper split die group 212a, and the rib 133 is accommodated in the rib accommodation portion 214. In this case, the fourth abutting surfaces 234 of the ribs 133 abut the horizontal surfaces 217a of the rib accommodation portion 214. As a result, the fourth abutting surfaces 234 of the cam 203 are restricted by the horizontal surfaces 217a of the rib accommodation portion 214, and positional deviation in the up-down direction of the cam 203 is prevented. In this way, the cams 203 are fixed to the inner portions of die upper and lower split die groups 112a and 212a. In addition, the cam body 32 floats so that the cam body 32 does not come into contact with any split die bodies 101a and 201a. In addition, as shown in FIG. 1, the upper case 51 overlaps with the lower case 52, and thus, as shown in FIG. 10, the upper and lower split die groups 112a and 212a are accommodated in the case 5.

(Processing Step)

Next, the pressurized fluid is introduced into the hollow portion of the hollow shaft, the hydroform processing is performed, and the cams 203 are fixed to the hollow-shaft by expanding the hollow shaft. In this way, the camshaft is manufactured. Thereafter, the upper case 51 and the upper split die group 212a are sequentially removed, and the manufactured camshaft is extracted. When the camshaft is extracted from the lower split die group 112a, the fitting between the ribs 133 of the cams 203 and the rib accommodation portions 114 of the split dies 101 may be released. Since the fitting between the ribs 133 and the rib accommodation portions 114 is generated by the contact between the inclined surfaces 134a and 177a, the fitting is released by simply lifting the cams 203 in the vertical direction with respect to the split dies 101. In this way, the camshaft is manufactured.

As described above, according to the camshaft-manufacturing method of the present embodiment, in addition to the effects of the first embodiment, the following effects are obtained.

When tire ribs 133 of the cams 203 are fitted into the rib accommodation portions 114 of the lower split dies 101, the third abutting surfaces 134 of the ribs 133 of the cam 203 sides are fitted into the pair of inclined surfaces 117a partitioning the rib accommodation portions 114. The pair of inclined surfaces 117a are configured so as to be separated from each other toward the butting surface 15, and in other words, since the pair of inclined surfaces 117a is disposed in a V shape when viewed from the side surface 11, it is possible to simultaneously perform positioning in the horizontal direction and the up-down direction, and it is possible to accurately determine the operation angles of the cams 203 with respect to the hollow shaft. Accordingly, it is possible to manufacture the camshaft having high accuracy in the operation angles of the cams 203 with respect to the hollow shaft.

In addition, since the pair of inclined surfaces 117a is disposed so as to be separated from each other toward the butting surface 15 and the third abutting surfaces 134 of the ribs 133 of the cam 203 sides abut the inclined surfaces 117a, when the camshaft is extracted from the lower split die group 112a after the upper split die group 212a is removed, it is possible to easily extract the camshaft by simply lifting the cams 203.

Moreover, since the fourth, abutting surfaces 234 of the cams 203 are restricted by the horizontal surface 217a of the upper split die 201, it is possible to prevent the positional deviation of the cams 203 in the up-down direction.

In addition, the cams 203 can be fixed by the rib-receiving surfaces 117 configured of the rib-receiving surfaces 117*a* provided on the lower split die group 112*a* and the rib-receiving surfaces 217 configured of the horizontal surfaces 217*a* provided on the upper split die group 212*a* in the state where the cams 203 are interposed from the upper and lower sides, and it is possible to manufacture the camshaft having high accuracy in the operation angles of the cams 203 with respect to the shaft.

The present invention is not limited to the above-described first to fourth embodiments, and various modifications can be applied within a range which does not depart from the gist of the present invention. For example, when the cams are fixed to the hollow shaft by expanding the hollow shaft, in order to strengthen the connection between the hollow shaft and the cams, protrusions may be provided on the inner circumferential surfaces of the through-holes of the cams.

INDUSTRIAL APPLICABILITY

According to the present invention, (1) It is possible to provide a camshaft-manufacturing method which increases accuracy of the operation angle of the cam with respect to the shaft without preparing the forming die for each type of the camshaft and additionally machining the manufactured camshaft, and (2) It is possible to provide a gear shaft-manufacturing method which increases accuracy of an attachment angle of a gear with respect to the shaft without preparing the forming die for each type and additionally machining a manufactured gear shaft.

BRIEF DESCRIPTION OF THE REFERENCE SYMBOLS

1, 60, 101, 210: SPLIT DIE
3, 103, 203: CAM
4: HOLLOW SHAFT
11, 61: SIDE SURFACE
12, 12*a*, 12*b*, 112, 112*a*, 112*b*, 212*a*: SPLIT DIE GROUP
13: RECESSED CAM ACCOMMODATION PORTION
14, 64, 114, 214: RIB ACCOMMODATION PORTION
17, 117, 227: RIB-RECEIVING SURFACE
17*a*, 217: HORIZONTAL SURFACE
17*b*: VERTICAL SURFACE
19, 119, 219: CAM ACCOMMODATION PORTION
31: THROUGH-HOLE
32: CAM BODY
33, 83, 133: RIB
34: FIRST ABUTTING SURFACE (ABUTTING SURFACE)
35: SECOND ABUTTING SURFACE (ABUTTING SURFACE)
41: HOLLOW PORTION
62: GEAR
63: RECESSED GEAR ACCOMMODATION PORTION
82: GEAR BODY
134: THIRD ABUTTING SURFACE (ABUTTING SURFACE)
234: FOURTH ABUTTING SURFACE (ABUTTING SURFACE)

The invention claimed is:

1. A camshaft-manufacturing method, comprising:
   preparing a plurality of split dies including recessed cam accommodation portions provided on side surfaces and rib accommodation portions formed in the recessed cam accommodation portions, configuring a split die group by butting side surfaces of the split dies, and forming a plurality of cam accommodation portions including the recessed cam accommodation portions between each adjacent pair of the split dies, in order to prepare the split die group;
   preparing a cam including a through-hole, a cam body which is smaller than each of the cam accommodation portions, and ribs which are provided on both sides in a thickness direction of the cam body and configured to be fitted into the rib accommodation portions, and a hollow shaft, and arranging the cam and the shaft so that the cam body is accommodated in the cam accommodation portions, the ribs are fitted in the rib accommodation portions, and the hollow shaft is inserted into the through-hole of the cam, in order to prepare processing; and
   introducing pressurized fluid into a hollow portion of the hollow shaft and performing hydroform processing, and fixing the cam to the hollow shaft by expanding the hollow shaft, in order to perform the processing.

2. The camshaft-manufacturing method according to claim 1, further comprising:
   preparing a pair of the split die groups in preparing the split die group; and
   fixing the cam and the hollow shaft so as to be interposed by the pair of split die groups in preparing processing.

3. The camshaft-manufacturing method according to claim 2,
   wherein a plurality of rib-receiving surfaces are provided on the rib accommodation portions of the plurality of split dies, a plurality of abutting surfaces are provided on the ribs of the cam, the abutting surfaces abut the rib-receiving surfaces when the cam is disposed on the cam accommodation portions, and the cam is fixed to the cam accommodation portions.

4. The camshaft-manufacturing method according to claim 3,
   wherein the plurality of rib-receiving surfaces of the plurality of split dies are configured of horizontal surfaces and a pair of vertical surfaces, and the plurality of abutting surfaces of the ribs of the cam are configured of first abutting surfaces abutting the horizontal surfaces and second abutting surfaces abutting the vertical surfaces.

5. The camshaft-manufacturing method according to claim 3,
   wherein the plurality of rib-receiving surfaces of the plurality of split dies are configured of inclined surfaces, and the plurality of abutting surfaces of the ribs of the cam are configured of at least two of the plurality of abutting surfaces abutting the inclined surfaces.

6. The camshaft-manufacturing method according to claim 3,
   wherein in the pair of split die groups, the plurality of rib-receiving surfaces of the plurality of split dies configuring a first split die group configured of inclined surfaces,
   wherein the plurality of rib-receiving surfaces of the plurality of split dies configuring a second split die group configured of horizontal surfaces, and wherein the plurality of abutting surfaces of the ribs are configured of at least two of the plurality of abutting surfaces abutting the inclined surfaces, and at least another two of the plurality of abutting surfaces abutting the horizontal surfaces.

7. The camshaft-manufacturing method according to claim 1,
wherein a plurality of rib-receiving surfaces are provided on the rib accommodation portions of the plurality of split dies, a plurality of abutting surfaces are provided on the ribs of the cam, the abutting surfaces abut the rib-receiving surfaces when the cam is disposed on the cam accommodation portions, and the cam is fixed to the cam accommodation portions.

8. The camshaft-manufacturing method according to claim 7,
wherein the plurality of rib-receiving surfaces of the plurality of split dies are configured of horizontal surfaces and a pair of vertical surfaces, and the plurality of abutting surfaces of the ribs are configured of first abutting surfaces abutting the horizontal surfaces and second abutting surfaces abutting the vertical surfaces.

9. The camshaft-manufacturing method according to claim 7,
wherein the plurality of rib-receiving surfaces of the plurality of split dies are configured of inclined surfaces, and the plurality of abutting surfaces of the ribs are configured of at least two of the plurality of abutting surfaces abutting the inclined surfaces.

10. The camshaft-manufacturing method according to claim 7,
wherein in a pair of split die groups, the plurality of rib-receiving surfaces of the plurality of split dies configuring a first split die group configured of inclined surfaces,
wherein the plurality of rib-receiving surfaces of the plurality of split dies configuring a second split die group configured of horizontal surfaces, and
wherein the plurality of abutting surfaces of the ribs of the cam configured of at least two of the plurality of abutting surfaces abutting the inclined surfaces, and at least another two of the plurality of abutting surfaces abutting the horizontal surfaces.

11. The camshaft-manufacturing method according to claim 1,
wherein in the preparing the cam, after the cam is mounted on the split die group so that the cam body is accommodated in the cam accommodation portion and the ribs are fitted into the rib accommodation portions, the hollow shaft is inserted into the through-hole of the cam.

12. The camshaft-manufacturing method according to claim 1,
wherein in the preparing the cam, after the hollow shaft is inserted into the through-hole of the cam, the cam is mounted on the split die group so that the cam body is accommodated in the cam accommodation portion and the ribs are fitted into the rib accommodation portions.

13. A gear shaft-manufacturing method, comprising:
preparing a plurality of split dies including recessed gear accommodation portions provided on side surfaces and rib accommodation portions formed in the recessed gear accommodation portions, configuring a split die group by butting side surfaces of the split dies, and forming a plurality of gear accommodation portions including the recessed gear accommodation portions between each adjacent pair of the split dies, in order to prepare the split die group;
preparing a gear including a through-hole, a gear body which is smaller than each of the gear accommodation portions, and ribs which are provided on both sides in a thickness direction of the gear body and configured to be fitted into the rib accommodation portions, and a hollow shaft, and arranging the gear and the hollow shaft so that the gear body is accommodated in the gear accommodation portions, the ribs are fitted in the rib accommodation portions, and the hollow shaft is inserted into the through hole of the gear, in order to prepare processing; and
introducing pressurized fluid into a hollow portion of the hollow shaft and performing hydroform processing, and fixing the gear to the hollow shaft by expanding the hollow shaft, in order to perform the processing.

* * * * *